United States Patent
Colliat et al.

(10) Patent No.: US 8,626,572 B2
(45) Date of Patent: Jan. 7, 2014

(54) SALES PERFORMANCE MANAGEMENT THROUGH QUOTA PLANNING

(75) Inventors: George H. Colliat, Emerald Hills, CA (US); Ajay A. Awatramani, San Francisco, CA (US); John Kuzmicki, Haymarket, VA (US); Vaishnavi A. Sashikanth, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 393 days.

(21) Appl. No.: 12/763,520

(22) Filed: Apr. 20, 2010

(65) Prior Publication Data

US 2011/0196717 A1 Aug. 11, 2011

Related U.S. Application Data

(60) Provisional application No. 61/301,876, filed on Feb. 5, 2010.

(51) Int. Cl.
*G06Q 20/00* (2012.01)

(52) U.S. Cl.
USPC ....... 705/10; 705/7; 705/8; 705/35; 705/36 R

(58) Field of Classification Search
USPC .......................... 705/7, 8, 9, 10, 14, 35, 36 R
See application file for complete search history.

(56) References Cited

U.S. PATENT DOCUMENTS

| | | | |
|---|---|---|---|
| 7,620,564 B1 * | 11/2009 | Lippock | 705/7.29 |
| 2002/0188535 A1 * | 12/2002 | Chao et al. | 705/35 |
| 2004/0039640 A1 * | 2/2004 | Koppelman et al. | 705/14 |
| 2004/0148245 A1 * | 7/2004 | Chen et al. | 705/37 |
| 2005/0197887 A1 * | 9/2005 | Zuerl et al. | 705/10 |
| 2006/0010017 A1 * | 1/2006 | Hase et al. | 705/7 |
| 2008/0162487 A1 * | 7/2008 | Richter | 707/10 |
| 2009/0139344 A1 * | 6/2009 | Lindeman | 73/859 |
| 2010/0161365 A1 * | 6/2010 | Lokowandt et al. | 705/8 |
| 2010/0161366 A1 * | 6/2010 | Clemens et al. | 705/8 |

* cited by examiner

*Primary Examiner* — Nga B. Nguyen
(74) *Attorney, Agent, or Firm* — Campbell Stephenson LLP

(57) ABSTRACT

A method of quota planning. In one embodiment, the method includes determining a top-down goal. The top-down goal indicates an expected amount of sales for a sales territory of a sales territory hierarchy. The method also includes generating a bottom-up recommendation for the sales territory and specifying a quota for the sales territory. The bottom-up recommendation is reconciled with the top-down goal, resulting in a quota that indicates an assigned amount of sales for the sales territory.

20 Claims, 11 Drawing Sheets

Manage Sales Quotas

Sales Quota Plan
Name: Sales Quota Plan
Description: Sales Quota Plan

Year: 
Status: Active

Start Date 01/01
End Date 12/31

Edit Sales Quotas

Action ∨ View ∨ Format ∨ | Calculate | Distribute ∨ Publish

| Territory Name | Territory Team | Territory Quota | Owner's Quota | Status | Details |
|---|---|---|---|---|---|
| Western US | Fred Smith | 1,000,000 | 1,000,000 | Published | |
| Desert States | Frank Noname | 300,000 | 300,000 | Not Published | |
| Pacific Northwest | Lopez Mateo | 300,000 | 300,000 | Not Published | |
| Golden States | Kumar Willisamy | 300,000 | 300,000 | Not Published | |

Rows Selected: 1 | Columns Hidden: 4

Quota Analytics: Western US
View: Resource Quota Report

Action ∨ View ∨ Format ∨ | Notify Compensation

| Resource Name | Territory Name | Target Type | Resource Quota | Compensation Plan Quota | | |
|---|---|---|---|---|---|---|
| | | | | Status | Submitted Date | |
| Jeff Thomson | North America | Revenue | 150,000 | Submitted | 10/10 | |
| Fred Smith | Western US | Revenue | 100,000 | Submitted | 10/10 | |
| Kumar | Golden Pacific | Revenue | 100,000 | Not Submitted | | |
| Frank Noname | Desert States | Revenue | 100,000 | Not Submitted | | |
| Annie Oakley | Pacific Northwest | Revenue | 100,000 | Not Submitted | | |
| Sarah Corner | Western US - | Revenue | 100,000 | Submitted | 10/10 | |
| Mike Proctor | Western US - | Revenue | 300,000 | Submitted | 10/10 | |
| John Joe | Western US - | Revenue | 100,000 | Not Submitted | | |
| John Dyson | Western US - | Revenue | 100,000 | Not Submitted | | |
| Jeff Hainz | North America | Revenue | 300,000 | Submitted | 10/10 | |

Rows Selected: 1 | Columns Hidden: 2

Variance: Western US

Territory Quota | Quota Allocated | Variance

SALES PERFORMANCE MANAGEMENT THROUGH QUOTA PLANNING

CROSS REFERENCE TO RELATED APPLICATIONS

This application claims the benefit under 35 U.S.C. §119 (e) of U.S. Provisional Application No. 61/301,876 filed Feb. 5, 2010, entitled "Sales Performance Management Through Quota Planning," and naming George Colliat, Ajay Awatramani, John Kuzmicki, and Vaishnavi Sashikanth as inventors. The above-referenced application is hereby incorporated by reference herein in its entirety as if completely and fully set forth herein.

FIELD OF THE INVENTION

The present invention relates quota management, and more particularly to utilizing information from multiple sources to produce quotas.

BACKGROUND OF THE INVENTION

Businesses often rely on sales of products to supply revenue. Often, the products are sold by individuals who comprise a sales force. Sales force management can increase sales force productivity. Sales force management systems can be used to manage thousands of sales representatives, multiple levels of management, and sales all over the world. Sales force management systems can also be used to manage smaller sales operations.

There are many aspects of sales force management. One aspect of sales force management is quota management. Quota management can include setting goals and expectations for sales force performance and tracking sales against those goals. A quota management system should motivate a sales force while supporting organizational objectives. For example, the quota management system can strike a balance between keeping a sales force motivated, increasing sales margins, and supporting organizational sales objectives.

The following disclosure is presented in terms of sales force management and sales quotas. However, the present invention is not limited to sales-related contexts. For example, the methods and systems disclosed herein can be used in the context of, for example, marketing forecasts, tele-sales, technical sales, sales consultants, business development roles, support roles, marketing managers, account managers, and the like. In summary, this disclosure is relevant to any customer-centered (requiring direct or indirect customer interaction) role in an organization whose performance is measured with goals.

SUMMARY OF THE INVENTION

A method of quota planning is disclosed. In one embodiment, the method includes determining a top-down goal. The top-down goal indicates a goal amount of sales for a sales territory of a sales territory hierarchy. The method also includes generating a bottom-up recommendation for the sales territory and specifying a quota for the sales territory. The quota represents a reconciliation between the top-down goal and the bottom-up recommendation and indicates an expected amount of sales for the sales territory.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 8A is a screenshot showing a view of a user interface, according to one embodiment.

FIG. 8B is a screenshot showing a view of a user interface, according to one embodiment.

FIG. 8C is a screenshot showing a view of a user interface, according to one embodiment.

DETAILED DESCRIPTION

Figure 1:
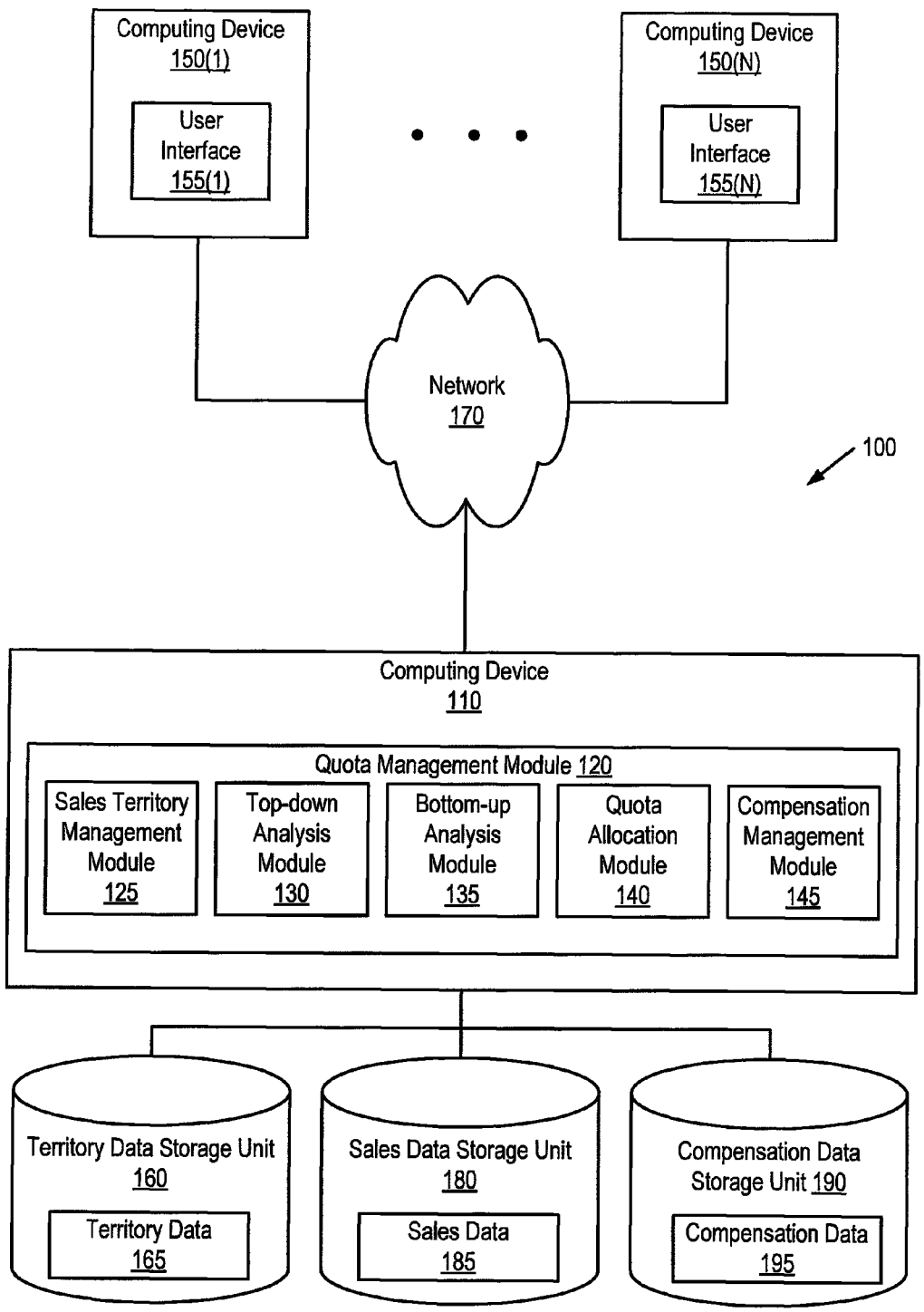
FIG. 1 is a block diagram of a quota management system, according to one embodiment.

An organization (such as a businesses or corporation) can utilize sales representatives to sell products (e.g., goods and services). For example, a company can utilize sales representatives to sell the company's products. A sales representative can be employed by an organization and compensated for services rendered. For example, a sales representative can be paid a salary as well as a commission (e.g., in incentive based on based on volume of sales or some other sales performance measure), or some combination of the above. Incentive driven compensation is common. That is, a sales representative's compensation often depends on the sales representative's contribution, for example, to the amount or volume of sales. Managing sales representatives, also known as sales force management, can include, for example, specifying what product(s) each sales representative will sell, specifying to whom the sales representative will sell, specifying an amount or volume (units) of sales the sales representative is responsible for making, and tracking those sales.

Historically, a sales representative was assigned a geographic region, such as a particular city, county, or state. The sales representative was responsible for selling the company's products in the assigned geographic region, and would often set out on foot or in a car to sell the products face-to-face and door-to-door. As the variety and complexity of products and services available in markets has increased, sales force management has become more complex. An increase in the types of channels by which sales can be made has also led to a significant increase in the complexity of sales force management. For instance, sales representatives can sell directly to customers, through reseller networks, using sales partners, or any combination thereof. Furthermore, whereas the majority of sales were historically made through direct personal interaction, today's sales representatives can avail themselves of an array of technological advances, such as email, internet sales, and telemarketing. These technological advances have helped overcome the geographical limitations previously faced by sales representatives, though most sales forces are still geographically organized to facilitate personal relationships between sales representatives and customers. Door-to-door selling on foot is largely a thing of the past, and sales today are mostly about business to business sales. Sales representatives can leverage relationships and contacts at prospective customer companies to drive sales. Sales representatives can be responsible for selling to a target market that can be scattered all over the world. The market, or "sales territory," a sales representative is responsible for can be defined based on numerous criteria, of which geography is just one. For example, in one embodiment, a sales territory can be based on characteristics such as geography, a product, a customer account, a customer size, an industry type, and/or time.

Sales quota management can also be influenced by industry specific factors. For example, sales territories in high tech, pharmaceutical, or manufacturing industries may have their own specialized criteria for defining sales territories and specifying sales quotas. In some instances, a sales quota can be simply described as a number of sales visits or number of samples dropped (e.g., in the pharmaceutical industry). Sales quota management can also be applied to partner management scenarios. For example, if a partner owns a set of territories (e.g., a car dealer), a manufacturer can set quotas for various partners (e.g., a particular care manufacturer).

As defined herein, a sales territory is the jurisdiction of responsibility of a sales representative. For example, a sales representative can be responsible for a given geographic area, a particular product, family of products, or type of product, a particular customer, a particular type of customer, a particular industry, or any of the above (and others) for a particular period of time. Once defined, sales territories ensure that sales accounts, leads, opportunities, and orders are assigned to the proper sales representatives. As used herein, sales territories thus serve as a basis for forecasting, quota, compensation, analysis of sales performance and the like.

Sales territories can also be part of a sales territory hierarchy. A sales territory hierarchy can include a top level sales territory and one or more levels underneath the top level. The levels immediately below a sales territory are known as child sales territories, while the level above the child sales territory is known as a parent sales territory. All sales territories below a given sales territory in the sales territory hierarchy (including those immediately below or multiple levels below) are known as constituent sales territories. The sales territory hierarchy is often broken down with the largest segments at the top, and the most specific segments at the leaf nodes. For example, a top-level sales territory can specify an entire industry, while the child sales territories can specify segments of the industry.

An integral part of sales force management is setting quotas. A quota reflects an expectation of an amount of sales. Quotas are often expressed in terms of sales. For example, a quota can be expressed in terms of total sales in currency, or sales volume (units sold). Additional quota measures can include sales margin, sales activities (e.g., number of times a sales representative visited a customer), and the like. For example, a quota of $1M might be set for a given sales representative. In such a case, the quota denotes that the sales representative is responsible for generating $1M worth of sales. A quota specified for an individual is referred to herein as a personal quota. A quota is often associated with the performance of a sales territory. This type of quota is called a sales territory quota. For example, setting a sales territory quota of $2M for a given sales territory indicates that the sales territory is expected to yield $2M worth of sales. Personal quotas can be tracked separately from the quotas for sales territories. For example, multiple sales representatives can be assigned to a given sales territory. The sales territory can have a specified sales quota and the sales representatives can have their own sales quotas. This can be advantageous, for example, in a situation in which sales force personnel transfer to different departments, take leaves of absence, move out of the organization or the like. Quotas can also be set based on the type of sales, for example, a quota can be set for the amount of telesales, or technical sales carried out for a particular sales territory.

A sales administrator can be tasked with setting quotas for an organization's sales force and can be responsible for managing the sales process and providing infrastructure and guidance necessary for successfully sell. A sales force includes the sales representatives tasked with selling an organization's products. A sales force can also include other personnel such as sales administrators and support staff. A sales administrator can be any person involved in sales force management. For example, a sales administrator can be a sales manager responsible for directly managing one or more sale representatives, or a sales director responsible for overseeing sales operations for business units or groups. Alternatively, a sales administrator can be an employee in an accounting, sales operations, IT, finance, or business improvement position, for example. Each sales territory can have its own sales administrator; while the sales administrator can manage the process for multiple territories. There also exists the concept of a global sales administrator, who is responsible for the overall quota setting process across all sales territories and is also responsible for kicking off the fiscal year quota planning cycle.

Setting accurate quotas is one objective of a sales administrator tasked with setting quotas. Sales administrators have the twin objective of maximizing sales and increasing margins while keeping the sales force motivated with appropriate incentives for sales. This necessitates the need for setting accurate sales quotas. An accurate sales quota is a sales quota that is attainable, yet aggressive (i.e., one that will require significant effort to achieve). If the sales force is capable of meeting the quota (e.g., selling the amount of products specified by the quota), the quota is attainable. If a quota is not attainable, this indicates that the quota is set too high. A quota should also be aggressive. The objective of setting aggressive quota is to maximize sales and capture all available opportunity. This will drive superior performance from the sales force. That is, the sales force should find it challenging to meet the quota. If a quota is aggressive, the sales force will have to expend significant effort, in order to sell the amount of products specified by the quota. If a quota is not aggressive, the quota is set too low. Sales representatives get incentivized appropriately when they achieve or beat the quota set for them. Therefore, the task of quota setting is a fine balance between meeting organizational goals and keeping the sales force motivated.

A sales force is often compensated based on sales performance relative to a quota, either individually or as a group.

Compensation plans are designed to reward successful sales representatives. The greater the attainment towards a quota, the larger the scale of incentives. For example, when a sales force meets a quota, the sales force can receive bonus payments. Typically, the payout (or bonus) is given on a sliding scale. The incentives increase substantially for upper quartile achievers. All of this depends on how the compensation plan is designed. Naturally, such a compensation system provides an incentive to the sales force to attain the quota. If a quota is set too high to be attainable, however, it is impossible for the sales force to meet the quota. In this case, the sales force may receive a smaller bonus, or no bonus at all, thus losing some incentive. This could potentially result in the sales force producing less sales.

On the other hand, if a quota is set too low (not aggressively enough), the quota fails to maximize a sales force's sales potential. If quota is not sufficiently aggressive, the sales force can easily attain and exceed their quota thereby compressing sales margins. Alternately, the sales force may not be driven enough to maximize the potential opportunity presented by the territory and may "leave money on the table." If the sales force is able to attain the quota with minimal effort, the overall sales will likely be lower than could have been achieved if the sales force had received proper motivation through incentives. For example, if a sales force attains a quarterly quota in the first month of the quarter, the sales force may not be as productive during the second and third month of the quarter since the sales force has already secured any bonus payment due upon reaching the quota. If a sales administrator sets a sales quota appropriately, the quota is aligned with an organization's strategy, initiatives, and objectives. Such a quota provides direction to the sales force, making sales representatives aware of the organization's needs and goals.

The task of setting quotas appropriately has increased in complexity and difficulty as markets have increased in complexity. An accurate quota should reflect the sales opportunities that a sales force can reasonably be expected to close. If certain geographies previously owned by a sales representative are no longer assigned to the sales representative's territory, then the quota for the territory should reflect that reality and be appropriately adjusted to reflect the territory's potential. Sales administrators take various approaches in their efforts to set quotas appropriately. In one embodiment, a sales administrator can set a quota based on organizational goals. An organizational goal can be a goal, or target amount of sales, specified by a company's leadership. A quota specified by a company's leadership is referred to herein as a top-down quota. For example, a company's executive team might decide upon a goal of increasing sales revenue by 10 percent over the sales revenue for the previous year. The top-down quota (target) of a 10 percent increase in sales can be communicated from the executives to the sales force management team and individual sales representatives. Quota planning involves establishing a quota the organizational level in concert with a company's leadership. The quota is then distributed through the sales force. Since the sales force and sales territories can be organized hierarchically, the quota is distributed "top-down" through this hierarchy.

However, a simplistic view of quotas without taking into account variability at each territory and sales resource is seldom effective. Consider an example in which an organization's leadership specifies a top-down goal of a 10 percent increase in sales over the previous year's sales. The goal of a 10 percent increase can be communicated from the company's leadership to sales force administrators and sales representatives. However, simply stating that a 10 percent increase is required grossly over simplifies the typical situation, and so fails to account for the complexity of modern sales force management. For example, consider an organization with 500 sales representatives. In this example, the organization's executive leadership has specified a top-down goal of a 10 percent increase over last year's sales revenue. If each of the 500 sales representatives increases his sales by 10 percent, the goal will be achieved. However, the quota of a 10 percent increase may be too aggressive in some cases (unattainable) and not aggressive enough (too low) in other cases. In the case of a sales representative for whom a 10 percent increase is unattainable, the sales representative may be disincentivized, and may actually sell less. In another case, a sales representative may be able to easily increase sales by 20 percent. However, such increase may not be obtained since the quota specifies only a 10 percent increase. The sales representative who can increase sales more than 10 percent may not do so because the sales representative, lacking clear guidance to the contrary, perceives no benefit to an increase above the requested 10 percent. For example, the sales representative may be aware that no additional bonus is to be paid if the sales representative increases sales by more than 10 percent. The ability of an individual sales representative to meet a top-down goal can depend on numerous factors, such as the sales territory to which the sales representative is assigned, economic factors specific to a given region, industry, or product, whether the sales representative's customers are established customers or new prospects, and the like. In an organization with numerous representatives and varied and complex components affecting the performance of the sales force, a simplistic "one-size-fits-all" view of quotas yields ineffective sales force utilization and thereby, poor sales results.

Alternatively, a sales administrator can set a quota based on historical sales performance information. Historical sales performance information can include, e.g., an amount of past sales for a sales representative or for a sales territory. Quota setting based on historical sales performance information is known as a bottom-up approach to quota setting. Effective use of historical sales performance information has traditionally depended upon the experience and longevity of sales administrators. The departure of a sales administrator (e.g., due to retirement or moving to another company) could significantly diminish an organization's ability to effectively leverage historical sales performance information.

As the amount of historical information has grown, sales administrators have turned to computers to help utilize historical sales performance information. Sales administrators can use computers to rapidly access and analyze large amounts of historical sales performance data. For example, a sales administrator can access historical sales performance data to determine the amount of sales for a given sales territory in each of the last several quarters or years, depending on how much historical sales performance data is stored. Evaluating the past performance (e.g., the amount of sales generated) of a sales territory can provide a sales administrator with some insight as to the likely performance of the sales territory in the future. In addition to historic sales revenue, there are numerous metrics that can be taken into account including, for example, sales pipeline, potential, forecast revenue, number of customers, number of new customers, greenfield customers vs. installed base, pipeline mix, pipeline coverage, lead revenue, and the like. Based on such information, a sales administrator can generate a bottom-up recommendation of an amount of sales that the sales territory is likely to produce. This recommendation includes a quota estimate arising from a bottom-up analysis of the sales territory based on things like a sales territory's previous year performance, multi-year trends in sales or potential, expected growth, what products are selling well, what customers or industries have biased growth, and the like.

However, basing a quota exclusively on a bottom-up recommendation can result in a quota that is not responsive to organizational goals. A quota generated without consideration of organizational objectives may well fail to meet those organizational objectives. For example, an organization's leadership may wish to increase sales in a particular geographic region or type of industry. Unless these organizational objectives are considered while generating a quota, these organizational objectives may not be achieved.

Traditional quota management systems have utilized either a top-down or a bottom-up approach. However, these quota management systems are incapable of providing an integrated approach, setting a quota based on an integrated top-down goal and a bottom-up recommendation. Top-down goals and bottom-up recommendation are generally based on different types of information from different sources. Not only is it a challenge to incorporate such disparate types of information, from such different sources, but there arises the issue of conflicts between the two. A sales administrator will encounter a variety of problems if a bottom-up recommendation and a top-down goal conflict, or differ with respect to a given sales representative or sales territory.

For example, consider a company, Company A. If Company A uses a top-down approach to quota setting, an executive of Company A can set an exemplary sales goal of $10M for the first quarter of a given year. However, as noted above, this top-down approach can lead to problems, such as an improperly incentivized sales force. If, on the other hand, Company A decides to use a bottom-up approach to quota setting, a sales administrator can recommend that a quota of $8M in sales for the first quarter be set based, e.g., on the amount of sales for the first quarter of previous years. However, as noted, a bottom-up approach can lead to problems resulting from a lack of consideration of or failure to be responsive to Company A's organizational objectives. Also as noted, if Company A attempts to use both a top-down and bottom-up approach to quota setting, reconciling the quotas produced by the two approaches can be problematic.

In the above example, there is a $2M discrepancy, or variance, between the top-down goal ($10M) and the bottom-up recommendation ($8M). A sales administrator for Company A wishes to somehow reconcile the top-down goal and the bottom-up recommendation so that the top-down goal and the bottom-up recommendation match. One way the sales administrator could attempt to reconcile the top-down goal and the bottom-up recommendation is to arrange a meeting with the executive who set the top-down goal. The sales administrator could attempt to explain that the recommended amount of sales was lower than the top-down goal and ask the executive to adjust the top-down goal. It is not hard to imagine this approach may be less than completely successful. An iterative process of meetings, negotiations, and recalculations could ensue in order to eventually come up with a quota that takes into account both a top-down goal and a bottom-up recommendation, but the time and resources involved would be prohibitive.

Such a process can be improved. For example, the effectiveness of going back and forth between the executive and sales administrator depends on how well the executive and sales administrator communicate with each other, scheduling considerations for scheduling the communications between the executive and sales administrator, and the like. As will be appreciated, then, this back and forth process is fraught with the possibility of inefficiency and ineffectiveness, and thus typically lends to the setting of inappropriate quotas, such as quotas that are too aggressive in the case of certain sales representatives, and not aggressive enough in the case of other sales representatives.

An alternative to the foregoing approaches to quota setting can be implemented using a system such as that illustrated in FIG. 1. FIG. 1 is a block diagram of a quota management system 100, according to one embodiment. Quota management system 100 is well-suited to performing quota setting operations, while avoiding the aforementioned disadvantages. For example, a user (e.g., a sales administrator) can access quota management system 100 to perform operations to generate appropriate quotas, through the ability of quota management system 100 to reconcile discrepancies between top-down goals and bottom-up recommendations. For example, consider an executive who sets a goal. The goal identifies both a given sales representative under the executive's management and a given sales territory. Since the goal is assigned by the sales representative's manager, the goal is known as a top-down goal. The sales representative is responsible for meeting the goal. Assume the sales representative manages two junior sales representatives. The sales representative can distribute the goal between the sales representatives on an ad hoc basis (e.g., $5M each) or analyze the potential of the territories for each junior sales representative and assign the goal based on the analysis (e.g., $3M to one junior sales representative and $4M to the other junior sales representative). This distribution would leave $3M yet to distribute. This is known as variance.

As shown, quota management system 100 includes computing devices 150(1)-150(N), which include user interfaces 155(1)-(N). User interfaces 155(1)-(N) can be implemented using a standard graphical user interface, for example. Thus, user interface 155 can be configured to allow a user to interact with the quota management system by using graphical icons and pointing devices, text-based interaction, and/or touch interface interactions, for example. A user can enter, view, and manipulate both top-down goal information and bottom-up recommendation information via user interface 155, in addition to various other quota management information, such as sales territory hierarchy management data, quota allocations, and compensation data.

As shown, quota management system 100 also includes a computing device 110, which implements a quota management module 120. Computing device 110 can be implemented as a server, for example. In one embodiment, quota management module 120 is implemented using the Oracle Fusion™ family of products, available from Oracle International Corporation of Redwood Shores, Calif. Quota management module 120 includes a sales territory management module 125, a top-down analysis module 130, a bottom-up analysis module 135, a quota allocation module 140, and a compensation specification module 145.

One or more of computing devices 150(1)-(N) and/or computing device 110 may be, for example, a computer system of any appropriate design, in general, including a mainframe, a mini-computer, a personal computer system, or a mobile computing device. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device.

FIG. 1 shows computing devices 150(1)-(N) and computing device 110 coupled by a network 170. Network 170 can include one or more Local Area Networks (LANs) and/or Wide Area Networks (WANs) such as the Internet. Network 170 can be implemented using various wireless links, coaxial cables, fiber optic cables, and the like. In some embodiments, certain components can be directly connected, as opposed to being connected via a network. In still other embodiments certain components, for example a user interface (e.g., one of the user interferences 155(1)-(N) and a quota management module (e.g., quota management module 120), can be implemented on a single device.

Computing device 110 is shown as being communicatively coupled to a territory data storage unit 160, a sales data storage unit 180, and a compensation data storage unit 190. Territory data storage unit 160, sales data storage unit 180, and compensation data storage unit 190 are date storage devices, and can be implemented using any storage technology, including hard disks, RAM disks, optical disks, tape or other media. These storage devices can be logical storage devices, such as volumes, or physical storage devices, such as solid state memory (e.g., a Flash memory device), magnetic storage (e.g., hard disks or tapes), and/or optical storage (e.g., digital versatile discs (DVDs) and/or compact discs (CDs)), or groups of multiple such storage devices (e.g., optical storage jukeboxes, tape libraries, hard disk arrays such as just a bunch of disks (JBOD) arrays or redundant array of independent disks (RAID) arrays, and the like). If sales data storage unit 180 and compensation data storage unit 190 are logical storage devices, those logical storages device can in turn be implemented on underlying physical storage devices.

Territory data storage unit 160, sales data storage unit 180, and compensation data storage unit 190 store territory data 165, sales data 185, and compensation data 195, respectively. Territory data 165 can include information such as how sales territories are divided and organized, and which sales representatives and/or managers are responsible for each sales territory. Compensation data 195 can include information such as a detailed summary of current and historical compensation for each member of a sales force, for example. Sales data 185 can include information such as historical sales performance information (e.g., the amount of sales for each sales representative and sales territory). Sales data 185 can also include top-down goals and bottom-up recommendation, both historical and current.

Quota management system 100 employs the concept of sales territories, as defined above. In one embodiment, sales data 185 can include one or more sales data online analytical processing (OLAP) cubes (referred to herein as a "sales data cube"). As will be apparent, users of the quota management system can create and employ multiple queries of multiple types. This flexible and efficient access to sales data stored in the sales data cube can provide greater insight into sales force capabilities and allow more effective quota setting and ultimately increased sales force production.

A sales territory can be defined using a sales data cube. More specifically, a sales territory can be defined as a slice of the sales data cube. The sales data cube can include, for example, the following six dimensions: geography, product, customer account, customer size, industry type and time. Further, such a sales data cube can also include a measures dimension and a dummy dimension that can be used, for example, to facilitate queries.

Sales data 185 can also include one or more sales territory definitions, which can be stored in one or more online transaction processing (OLTP) tables (referred to herein as "sales territory definition table(s)"). A user can utilize the sales territory definition tables to modify a sales territory definition without modifying the sales data cube. A user can also utilize the sales territory definition tables to query the sales data cube multiple times for a given territory without the need to define the sales territory more than once.

In quota management system 100, sales territories are created, modified, and deleted by users via sales territory management module 125 of FIG. 1. For example, the sales territory management module 125 provides a mechanism to redraw the boundaries of sales territories, and test the implications of such realignment on various metrics, prior to activating the updated sales territories. Companies can rebalance workload across sales territories and optimize the sales potential of their sales territories using the features of quota management system 100. The need to make such modifications can be determined based on certain factors. These factors can include for example, company mergers and acquisitions, changes in the sales organization such as people leaving or joining the sales force, poor sales productivity, and other such reasons that might prompt a change to the sales territory hierarchy structure or modifications to rules or resource assignments. Modifying a sales territory can include the addition or removal of dimension.

Not all changes to sales territories merit a corresponding modification of sales quotas. Therefore, quota management system 100 provides sales management with the ability to indicate whether a sales territory change requires a revision of quotas, and (optionally), a message indicating the proposed change. In other words, the sales territories that require a revision to their quotas can be marked or flagged in some way to so indicate. Thus a user can be made aware of any revisions to quotas that may be needed. For all such territories, the status of the quota can be indicated, for example, by the designation "Pending Revision" or the like. When quota planning commences, all quotas are assigned a status of "Not Published." When sales managers confirm quotas, the status is updated to "Published." Any subsequent revisions to a published quota results in the status of the quota being changed to "Pending Revision" before the quota can be published again.

In addition to these discretionary quota updates quota management system 100 can scan a sales territory hierarchy to identify territories that are deleted. For these territories, the system can set an end date for the sales territory quota, as well as the quotas for any sales personnel responsible for the sales territory. The quota management system can also scan for removal of sales force personnel (i.e., situations where sales force personnel leave the group or business unit or the company). Quota management system 100 automatically detects such changes, and sets an end-date for the sales quotas for these sales force personnel. These scans can be performed as stand-alone scans or routinely scheduled, (e.g., performed periodically).

In one embodiment, a revision to a sales territory quota does not directly impact quotas for either parent or child sales territories. For example, if a quota for the sales territory Western US is revised, the revision does not necessarily imply that the quota for North America (parent sales territory to Western US) needs to be revised, nor does the revision necessarily imply that the quota for child sales territories CA or AZ should be revised. In this embodiment, revisions to parent or child sale territory quotas will not occur unless a user explicitly indicates the parent or child sales territory quota needs to be revised. Though there need be no automatic revision of quotas for peers (sales territories at the same level), parent or child sales territories, a user can specify that quotas for various related sales territories be automatically updated upon detection of modification of a given sales territory. For example, percentage contributions of one or more child sales territories can be automatically updated in response to detection of revision of a quota for a given parent sales territory.

In one embodiment, a change to underlying sales data can affect sales territory quota-setting operations. For example, if a new product is introduced, or obsolete products or products no longer supported are removed, such changes can affect sales quotas for sales territories which include the affected products. Quota management system 100 automatically detects such changes, and alerts a user of a need to adjust any affected quotas. If such changes are made to a lower-level dimension member that is not part of any explicit territory definition, then such changes may not be detected by the quota management system. In such case, the quota management module is dependent on the territory management module to detect such changes. Each time an aspect of the sales territory hierarchy or quota allocation changes, a snapshot can be taken to help track and understand how quota allocations have changed.

Sales territory management module 125 also performs various other sales territory management operations, such as defining a sales territory hierarchy and obtaining approval from an organization's executive leadership for the sales territory and sales territory hierarchy definitions. In one embodiment, a user employs user interface 155 to enter and view information used in performing sales territory management operations.

As noted, quota management system 100 can overcome traditional limitations on territory definition. For example, in one embodiment, a user can define a territory based on criteria other than geography. A user can define a sales territory by specifying one or more dimensions which territory management module 125 can use to define a slice of a sales data cube, for example, a sales data cube stored in sales data 185. The sales territory is associated with, or represented by, the slice of the sales data cube.

A user can also use territory management module 125 to define a hierarchy of sales territories. Territory management module 125 can access data warehouse, select dimensions of a sales territory, establish and modify relationships between sales territories, create a sales territory hierarchy, store the sales territories and sales territory hierarchy, for example in a table in sales data 185.

Generally, a sales territory hierarchy (described subsequently with regard to FIG. 3) is defined at the beginning of a fiscal year. During the course of the fiscal year, the actual sales and pipeline can be tracked and compared to the quota. An organization may require the sales territories to be realigned to meet the challenges of the marketplace, for example if it becomes clear that actual sales will not meet the quota. Additionally, sales personnel (management and representatives) may transfer across sales territories, transfer outside the organization or terminate their employment. The changes to territory structure, scope and/or ownership is managed as part of a sales territory quota allocation process. Once the quota is allocated, the quotas for the realigned territories and their owners are adjusted dependent on the nature of the realignment. Generally, sales management is very discerning when it comes to adjusting quotas in the middle of a sales period such as an annual sales period.

There are numerous types of sales territories for which the quota management system of FIG. 1 can be used. For example, rule based sales territories are based on rules that define an abstract set of boundaries (geographies, products, customer type, industries, and business size) that are hierarchical dimensions. Rule-based sales territories are assigned to sales accounts based on the dimension attributes of the sales accounts. A dimension, as used herein, is a data category that can be used to organize data. Dimensions usually contain hierarchies of related members grouped within them. For example, a year dimension often includes members for each period, such as quarters and months. A sales territory can be defined as any aggregation of dimensions. For example, a given sales territory can be defined as including one or more specific products, customer sizes, and the like. Another type of sales territory is a named account sales territory. Named account sales territories are exceptions to the territory boundaries where lists of sales accounts are assigned manually by name to sales territories. Named account sales territories have an additional dimension that lists all the named accounts of the sales territory. The named accounts may be situated within the boundaries of other rule based sales territories.

Top-down analysis module 130 performs operations related to setting top-down goals for a sales force. For instance, when a user receives a top-down goal from an organization's leadership, the user enters the top-down goal via user interface 155. The top-down goal will typically embody the organization's objectives, as well as other goals. For example, a top-down goal can be a measure of sales the organization's leadership desires to achieve. As such, the goal can be an arbitrary measure or a mathematical calculation based on historical values. For example, the top-down goal can be calculated to be the amount of a previous year's sales plus an additional amount of sales. The user may receive the top-down goal from the organization's leadership via another computing device (not shown) connected to network 170 or by any other communications medium. For example, the user can receive the top-down goal via email, telephone, or in a face-to-face meeting. Once the user enters the top-down goal into quota management system 100 using user interface 155, the top-down goal is transmitted to top-down analysis module 130 of quota management module 120. Top-down analysis module 130 allocates a received top-down goal to multiple sales force components, (e.g., various sales territories in a sales territory hierarchy).

Bottom-up analysis module 135 performs bottom-up recommendation operations. For example, bottom-up analysis module 135 can generate a recommended amount of sales for one or more sales territories of a hierarchy of sales territories. Bottom-up analysis module 135 accesses sales data, generates recommendation based on historical data, and applies formulas to generate modified bottom-up recommendation.

Quota allocation module 140 performs quota allocation operations, accomplishing this objection by determining one or more sales territories for which a specified top-down goal and bottom-up recommendation do not match, and the amount of the mismatch, or variance, among other parameters. By generating an indication that a top-down goal and bottom-up recommendation do not match for a given sales territory, quota allocation module 140 simplifies a user's task of reconciling the variance. Quota allocation module 140 automatically calculates the total variance and recommends a quota for each sales territory in a hierarchy of sales territories such that the amount of variance is minimized (and preferably reduced to zero). Quota management module 140 also be designed to allow receive user input in this regard, thereby allowing the adjustment of either or both the top-down goal and/or the bottom-up recommendation. Once the top-down goal and bottom-up recommendation for a sales territory match, quota allocation module 140 can detect and indicate that the top-down goal and bottom-up recommendation for the sales territory match.

Compensation specification module 145 is designed to perform compensation specification operations. In one embodiment, a user creates and/or modifies a sales force compensation scheme using compensation specification module 145. In such a scenario, a user specifies a base pay, as well as other types of compensation, for one or more members of a sales force. For example, a user can specify a bonus structure for one or more sales representatives using compensation specification module 145. Compensation specification module 145 monitors and tracks compensation provided to sales force members. Compensation specification module 145 is also able to detect whether compensation paid to a sales force member is above or below predetermined thresholds. For example, if a given sales force member has not been paid a bonus for 3 consecutive years, compensation specification module 145 is able to detect this statistic, and generate an indication thereof. Compensation module 145 can also interface with a compensation planning solution (not shown) external to the quota management system. Once a compensation scheme is set, the compensation scheme can be stored, for example as part of compensation data 195 in compensation data storage unit 190.

Figure 2:
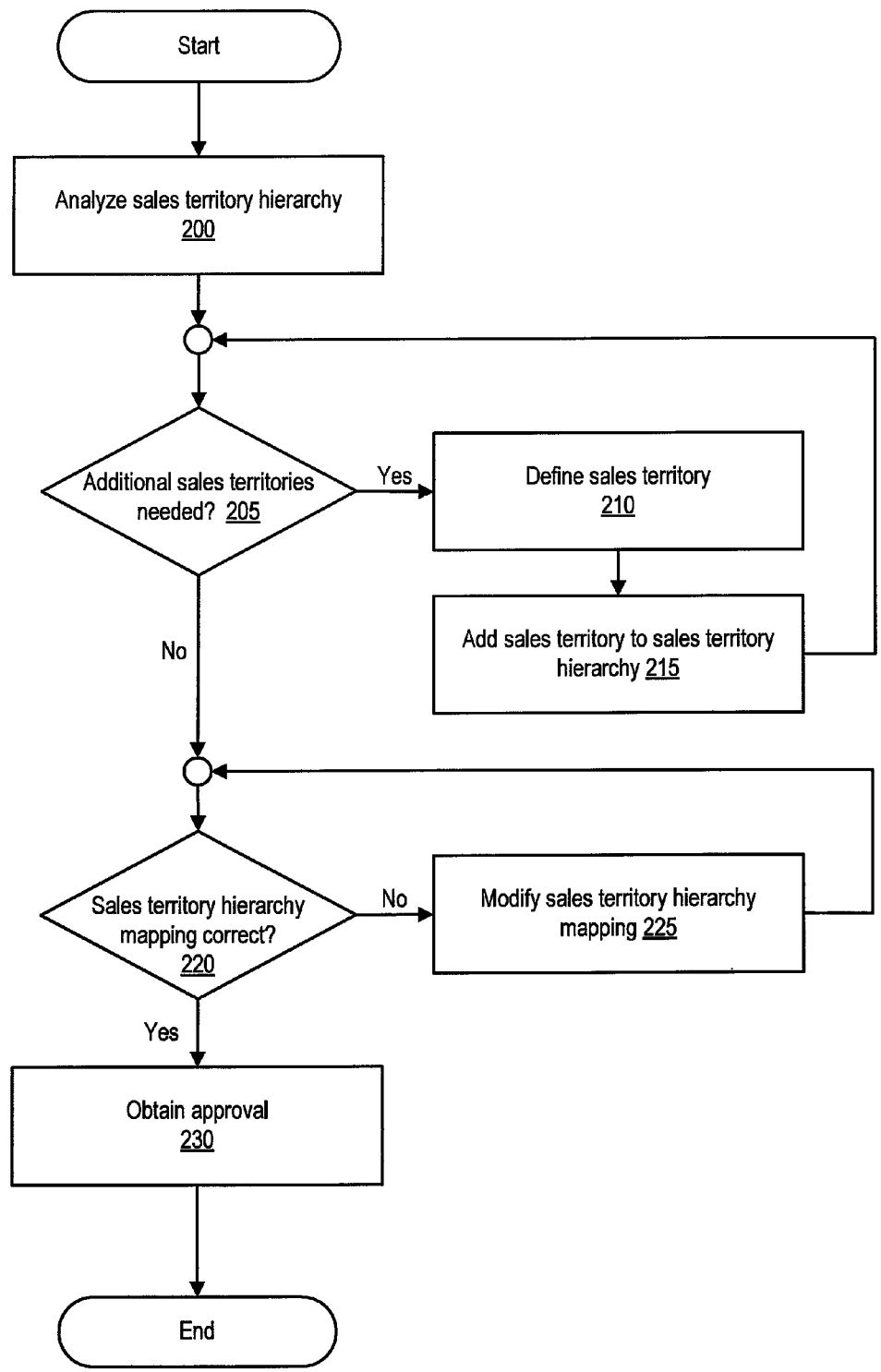
FIG. 2 is a flowchart that illustrates a process of performing sales territory management, according to one embodiment.

As discussed with respect to the following figures, a quota management module, such as quota management module 120 of FIG. 1, can be used to implement a quota management process. One aspect of the quota management system described herein is sales territory management. FIG. 2 is a flowchart that illustrates a process of performing sales territory management.

In one embodiment, the illustrated sales territory management process can be performed by a user using a territory management module, such as territory management module 125 of FIG. 1.

The first operation in the illustrated sales territory management process is the analysis of the given sales territory hierarchy (depicted in FIG. 2 as an analyze sales territory hierarchy operation 200). In this operation, a user, such as a sales administrator, is able to view a sales territory hierarchy territory. For example, such a user can access a user interface, such as user interface 155 of FIG. 1, to view a graphical representation of a sales territory hierarchy. Via the user interface, a user accesses and modifies sales territory hierarchy information presented by a sales territory management module, such as sales territory management module 125 of FIG. 1. In one embodiment, the sales territory information is stored in a sales data storage facility such as, for example, sales data 185 in sales data storage unit 180 of FIG. 1. The sales territory hierarchy can be composed of sales territory data organized into sales data cubes and tables.

A sales territory hierarchy can be organized such that a parent/child relationship exists between sales territories. The sales territory hierarchy can include a top level (root level) that encompasses all of an organization's sales territories and multiple lower levels that each encompasses one or more child territories. Each sales territory can have one or more sales force members assigned to the sales territory. For example, each sales territory can have a sales territory owner, who is responsible for meeting a quota assigned to the sales territory and a sales territory administrator, who is responsible for setting the quota for the sales territory. In one embodiment, the sales force member is responsible for sales in the given sales territory. A sales director or other executive team member can be assigned to the top-level sales territory in a sales territory hierarchy. Lower level sales territories can have sales managers assigned, while the lowest level sales territories can have one or more sales representatives assigned.

In analyzing a sales territory hierarchy, a user views not only the sale force member responsible for the sales territories of the sales territory hierarchy, but the user can also view sales data such as past sales performance data and forecast sales performance data. This can assist the user in identifying any changes to the sales territory hierarchy which might be needed. For example, if a particular sales territory has 3 child territories that are all under-performing, a user can deduce that there is a problem that might warrant a change to the sales territory hierarchy. The problem may be a personnel related issue, for instance the sales manager responsible for the 3 sales territories might not be effectively managing the sales representatives under the sales manager's authority. Alternatively, the sales representatives may be under-performing for other reasons. For example, the sales territory might be defined in such a way that the sales representatives are unable to be productive. For example, the sales territory can include a particular business sector that has experienced a downturn. Or the introduction of a new product can have made the products being sold less desirable. In another example, a sales territory can be exceeding performance expectations. In such a case, a user can attempt to discern the reason for the sales territory's successful performance so that the cause can be duplicated to other sales territories and overall sales force performance can be improved.

The sales territory management process then proceeds to a determination of the need for additional sales territories (depicted in FIG. 2 as an additional sales territories needed decision operation 205). The sales territory management module indicates that an additional sales territory is needed. For example, a sales force member or an executive team member can issue a directive indicating that a new territory should be created. This directive is stored in sales data and reflected in a graphical representation of the sales territory hierarchy. In another embodiment, a user is able to determine after analyzing a sales territory hierarchy that an additional sales territory should be created.

If additional sales territories are needed, the next operation in the process is to define the additional sales territory or sales territories (operation 210). In order to create a new sales territory, typically one or more dimensions associated with a sales data cube are selected. This can be automatically executed by the sales territory management module. Alternatively, a user can select one or more dimensions from a list of available dimensions. In one embodiment, defining a territory includes defining a Multidimensional Expressions (MDX) set. MDX is a programming language that can be used to query OLAP cubes.

Once an additional sales territory has been defined, the sales territory can be added to a sales territory hierarchy at operation 215. In one embodiment, a user identifies an appropriate location in a sales territory hierarchy for a sales territory by identifying a parent sales territory and/or one or more child sales territories. The user is then able to add the sales territory to the sales territory hierarchy. For example, if a sales territory defined as personal computers is to be added to a sales territory hierarchy, a user selects a location in the sales territory hierarchy for the personal computers sales territory. For example, the personal computers sales territory could be inserted into the sales territory hierarchy above sales territories for desktop computers and laptop computers, such that the desktop computers sales territory and laptop computers sales territory are child territories of the personal computers sales territory. Another sales territory at the same hierarchical level could be server computers. The personal computers sales territory could be inserted into the sales territory hierarchy below a computers sales territory so that the computers sales territory is the parent sales territory of the personal computers sales territory. The ability to insert sales territories in any desired location within a sales territory hierarchy allows improved flexibility in sales force management.

Subsequent to adding a sales territory to a sales territory hierarchy, the process depicted in FIG. 2 loops back to detect whether further additional sales territories are needed. If no further additional sales territories are needed, a determination is then made as to whether the sales territory hierarchy's mapping is correct (depicted in FIG. 2 as operation 220). Sales territory hierarchies can change due to a number of factors, resulting in incorrect mappings. For example, an organization can decide to stop selling a certain product. In this case, a user can determine that one or more sales territories has become obsolete, and so should be removed from the sales territory hierarchy. In another example, a sales force member responsible for a given sales territory may leave the organization. In that case, a user can detect responsibility for the sales territory that a new sales force member should be assigned to be responsible for the sales territory. In either case, the fact that a sales territory hierarchy is incorrect can be automatically detected by a sales territory management module or can be detected by a user (e.g., a user analyzing the sales territory hierarchy).

If the sales hierarchy mapping is incorrect, the process illustrated in FIG. 2 proceeds with modifying the sales territory hierarchy mapping at operation 225. As noted previously, a user can change various aspects of a sales territory, or can remove a sales territory from the sales territory hierarchy altogether. In one embodiment, the user is able to move a sales territory to a new location in the sales territory hierarchy, assigning a new parent sales territory and/or new child sales territories.

Subsequent to modifying a sales territory hierarchy mapping, the process illustrated in FIG. 2 returns to a determination as to whether the sales territory hierarchy mapping is now correct. If further corrections to the sales territory hierarchy mapping are needed (or desired), further sales territory hierarchy modification operations can be undertaken (sales territory hierarchy modification operations 225). If the sales territory hierarchy mapping is correct, approval for the sales territory hierarchy is obtained (depicted in FIG. 2 as obtain approval operation 230). In this operation, a user submits a sales territory hierarchy to a decision-making authority for approval. For example, the user can submit the sales territory hierarchy to an organization's executive leadership. Once approval has been obtained for a sales territory hierarchy, the user can proceed with further sales force management operations, such as quota setting.

Figure 3:
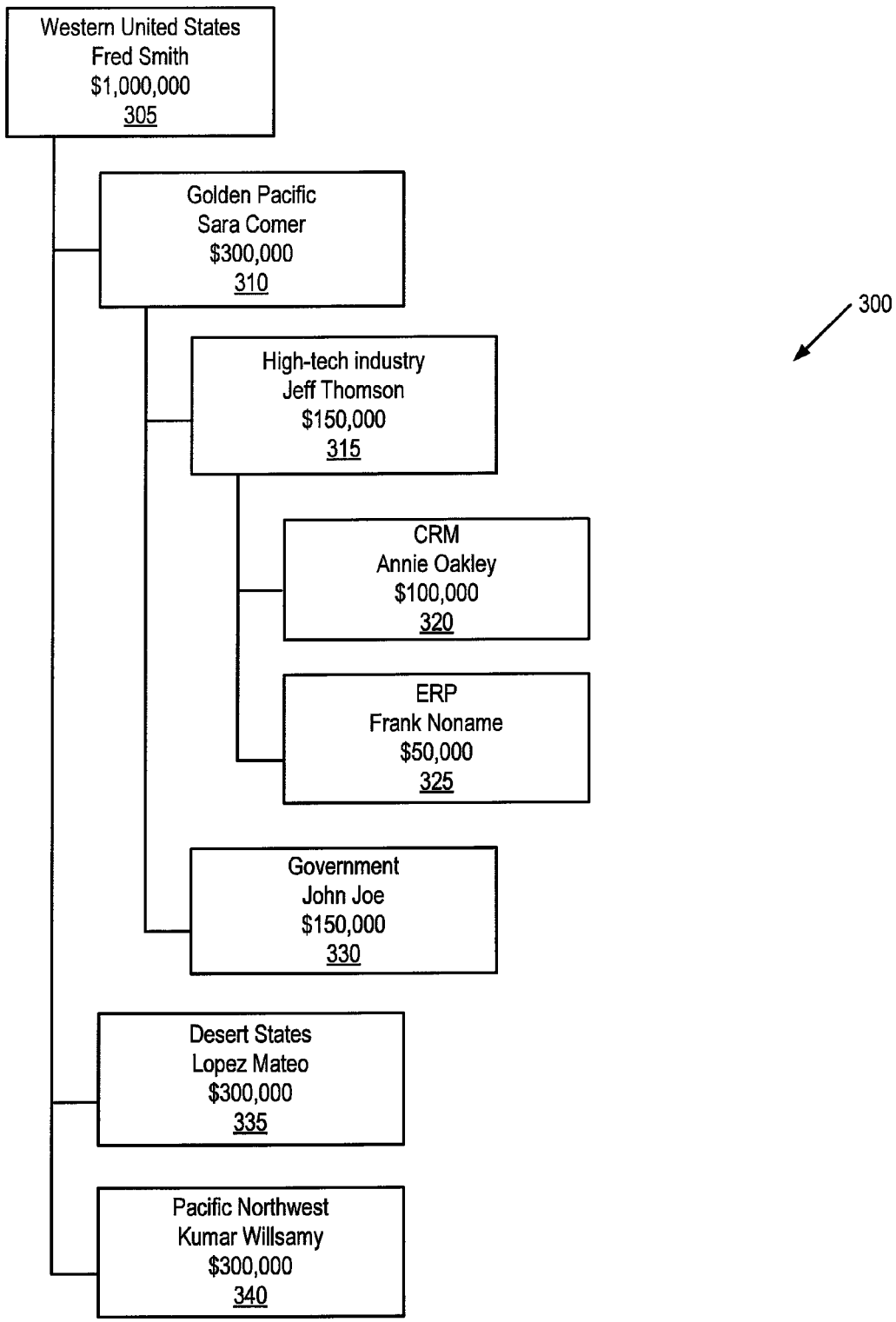
FIG. 3 is an example sales territory hierarchy, according to one embodiment.

FIG. 3 is an example sales territory hierarchy, according to one embodiment. As will be appreciated, a sales territory hierarchy 300 is depicted in FIG. 3, and is merely an example of what could easily be a much larger sales territory hierarchy, or in the alternative, a complete sales territory hierarchy. In sales territory hierarchy 300, a Western United States sales territory 305 is at the highest level in the hierarchy, and is the parent sales territory to a Golden Pacific sales territory 310, a Desert States sales territory 335, and a Pacific Northwest sales territory 340. Each sales territory shows an associated sales representative or sales manager responsible for the sales territory, as well as a quota for the sales territory. For example, the sales manager for the Western United States sales territory 305 is Fred Smith, and the quota for the Western United States sales territory 305 is $1 million. That is, a total amount of sales of $1 million is expected for the Western United States sales territory 305. It is noted that the sales managers (e.g., Fred Smith) may have distinct sales quotas (not shown) assigned for which the sales managers are responsible. Golden Pacific sales territory 310 has child sales territories including a high-tech industry sales territory 315 and a government sales territory 330. High-tech industry sales territory 315 has child territories including a CRM sales territory 320 and an ERP sales territory 325. Sales territory hierarchy 300 illustrates the manner in which sales territories of a sales territory hierarchy can be specified based on factors other than geography. For instance, a sales representative responsible for ERP sales territory 325 would be responsible for sales related to enterprise resource planning (ERP) to high-tech customers located in the Golden Pacific area of the Western United States. In one embodiment, there is an ERP sales territory (not shown) that is a child territory to government sales territory 330. In this example, a different sales representative can be responsible for ERP related sales to customers in the government sector.

Sales territory hierarchy 300 can be represented as a series of MDX expressions, in the manner of the following example:

```
T_1 (Western US, All Regions, All Industries, All Products)
    T_A (GP, All Industries, All Products)
        T_A1 (GP, High-Tech-Industry, All Products)
            T_A1A (GP, High-Tech-Industry, CRM)
            T_A1B (GP, High-Tech-Industry, ERP)
        T_B (GP, Government, All Products)
    T_B (Desert States, All Industries, All Products)
    T_C (Pacific NW, All Industries, All Products)
```

In one embodiment, a user is authorized to perform quota management operations for a limited set of sales territories. For example, a user might only be authorized to use the quota management system to view and modify quota related information, such as goals, recommendations, and quotas for a territory (or territories) for which the user is responsible. That is, a user such as a sales manager might be authorized to view a goal specified for sales territories in the sales manger's jurisdiction, but not for sales territories in another sales administrator's jurisdiction. The sales manager would typically not be permitted to update his own quota. Both the personal quota and territory quota numbers are assigned to him by his reporting manager; also the owner of his parent sales territory in the sales territory hierarchy.

In order to access information for a sales territory, a user is granted security access for that sales territory. Further, a user can be granted limited access, being allowed to perform only certain functions. For example, a sales representative can be granted access to view a goal of a sales territory under the sales representative's jurisdiction, but can be denied access to modify the goal. The sales representative can be denied access to view goals for sales territories that are not in the sales representative's jurisdiction.

Figure 4:
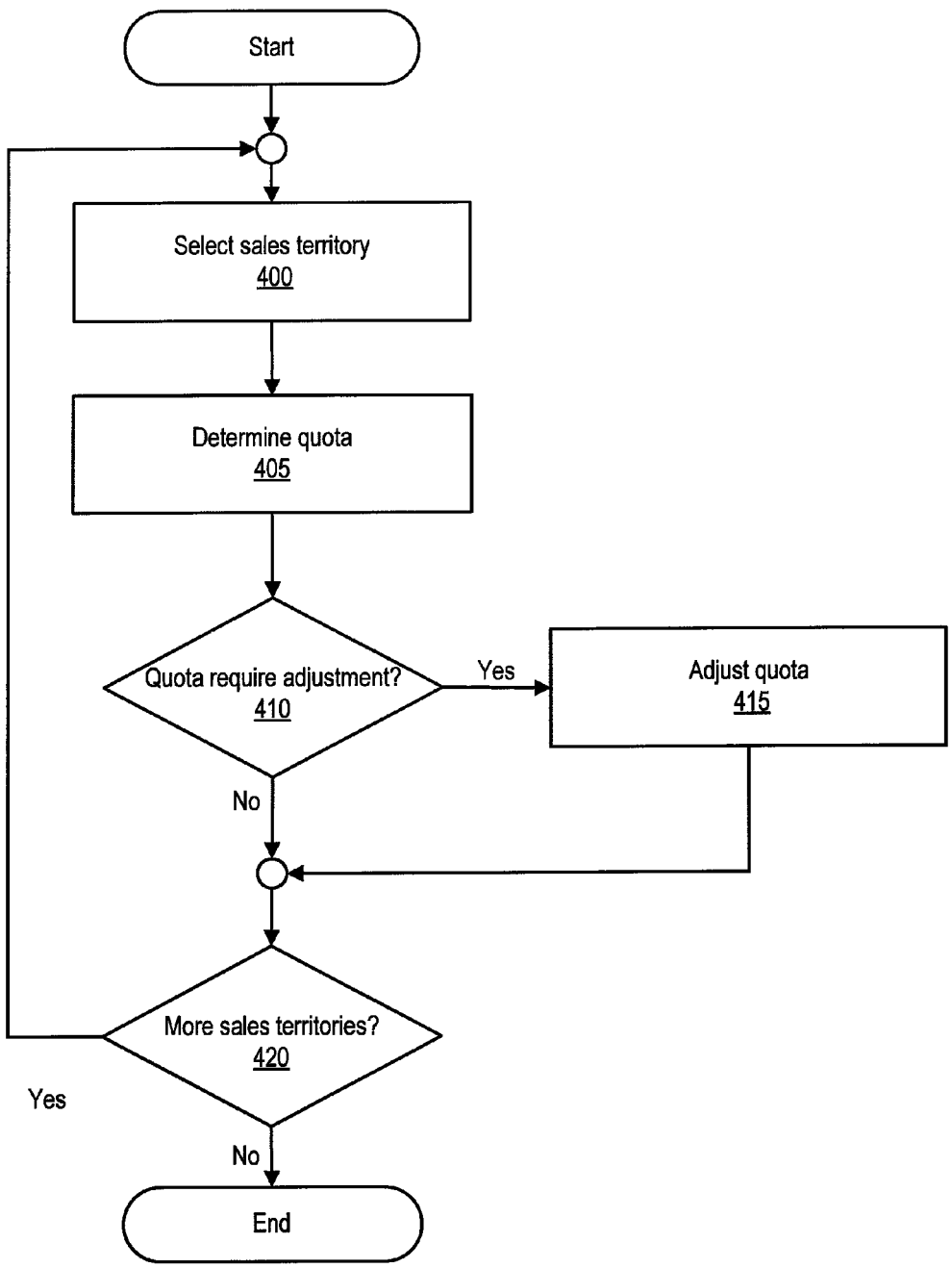
FIG. 4 is a flowchart that illustrates a process of performing a top-down analysis, according to one embodiment.

FIG. 4 is a flowchart illustrating a process for performing a top-down analysis using a quota management system, such as quota management system 100 of FIG. 1, according to one embodiment. A user of the quota management system generally performs quota management operations on a fiscal year basis. However, a user can select alternative start and end dates, specifying an alternative time period for which to perform quota management operations (e.g., monthly, quarterly or some custom time period). Furthermore, a user can specify a start and end date for performing quota planning operations. That is, a user can specify a time period during which a quota plan for an upcoming period is to be established. A quota plan is simply a sales quota allocation for one or more sales territories in a sales territory hierarchy. The quota management system can detect the end of the period of time and indicate that the quota planning period is completed. The quota management system can then freeze the sale territory hierarchy and quotas, and generate a snapshot of the sale territory hierarchy and quotas as of the end date of the quota planning period. Retrieving any completed quota plan typically displays the sales territory hierarchy as of the end date of the quota plan and the associated quota records. Access to completed plans or historical quota information can be limited to a subset of users, e.g., enterprise or global administrators.

The quota management system can display sales quota plans that are being tracked. For example, the quota management system can display a list of sales quota plans that have a "Track" flag set. The quota management system can also display a list of quota plans that a user is authorized to access. Such a list can include, for example active sales quota plans. The term active sales quota plans either refers to the present year sales quota plan or sales quota plans that embody future planning activity. Active quota plans are subject to quota revisions due to changes in territory. A user can also view sales quota plans that are pending activation. Depending on the task a user wishes to perforin, the user can select an appropriate active plan. For example, a user can track an active plan for analyzing the sales pipeline in the present year, as well as have the ability to plan for the upcoming year.

Completed sales quota plans are snapshots of past sales quota plans, such as quota plans for previous years. In some embodiments, completed quota plans are accessible only to a subset of users, such as global administrators. In these embodiments, completed sales quota plans are not accessible to sales managers. However, sales managers can access historical quota allocations of the territories they own in the context of active quota plans. For example, if a sales manager Fred Smith owns Pacific Northwest territory, he has access to historic quotas of that territory for current year.

The process of FIG. 4 begins with a user selecting a sales territory of a sales territory hierarchy (depicted in FIG. 4 as a select sales territory operation 400). In an alternative embodiment, a top-down analysis module, such as top-down analysis module 130 of FIG. 1, automatically selects a territory. The user then specifies a goal, or target quota (quota) for that sales territory (depicted in FIG. 4 as a determine quota operation 405). The quota represents an amount of sales the sales territory is expected to produce during a given period of time, (e.g., a year). The quota can be defined in any number of ways, including an actual dollar number of sales or a relative measure (e.g., a quota specifying a 10 percent increase over a previous year's sales). The quota can be set by the company's leadership, or determined based on an algorithm or formula. For example, the quota for a given sales territory can be simply carried forward from a previous year, such that the current quota matches a past quota for the sales territory.

In one example, the selected sales territory has one or more child sales territories. In this example, a user distributes the specified quota for the sales territory to the child territories. The user can specify that each child territory is responsible for a certain portion of the quota. For example, if a selected sales territory has three child sales territories, and a specified quota of $5M in sales, a user can distribute some portion of the quota to each of the three child territories. For example, a user could set a quota of $1M for each of the child territories. This means that the sales representative assigned to each of the three sales territories would be expected to produce $1M in sales. That would leave a quota of $2M for the sales representative assigned to the parent sales territory. In one embodiment, allocating portions of a specified quota to lower level sales territories is done automatically (e.g., by a top-down analysis module, such as top-down analysis module 130 of FIG. 1). For example, a top-down analysis module can calculate a percentage (e.g., 25%) of a quota and allocate that number to several (e.g., each of four) territories. In another embodiment, allocating portions of a specified quota to lower level sales territory can be performed in an iterative or recursive manual process.

Once a quota has been specified for a given sales territory, a user determines if the quota requires adjustment (operation 410). For example, a user can compare the quota with objective measures, such as industry standards for sales force perfounance. Alternatively, a user can determine the quota is not aggressive enough (or too aggressive) based on subjective factors, such as personal experience. If a user determines that the quota requires adjustment, the process provides the user with the opportunity to adjust the quota (depicted in FIG. 4 as an adjust goal operation 415). When adjusting a quota, a user can increase the quota (also known as padding the quota) or decrease the quota. For example, a user can add $1M to a quota determined to be too attainable. In one embodiment, such an increase or decrease can be propagated to one or more child territories, either automatically or manually. For example, if $1M is added to a quota of $10M for a given sales territory, representing a 10% increase, the quota of each constituent sales territory of the given sales territory can be increased by 10%. Padding a quota can be used, for example, to reduce the risk that the quota is too easily attained.

If the quota does not require adjustment, a determination is made as to whether more sales territories require the specification of a quota (operation 420). If more sales territories need quotas specified, the process returns to select territory operation 400. For example, if a first determine quota operation determines a quota for a subset of a sales territory hierarchy, and a portion of the sales territory hierarchy does not have a quota determined, the process can loop in order to allow the quota to be determined. Once the requisite quota have been determined for the sales territories in the sales territory, the process ends.

Figure 5:
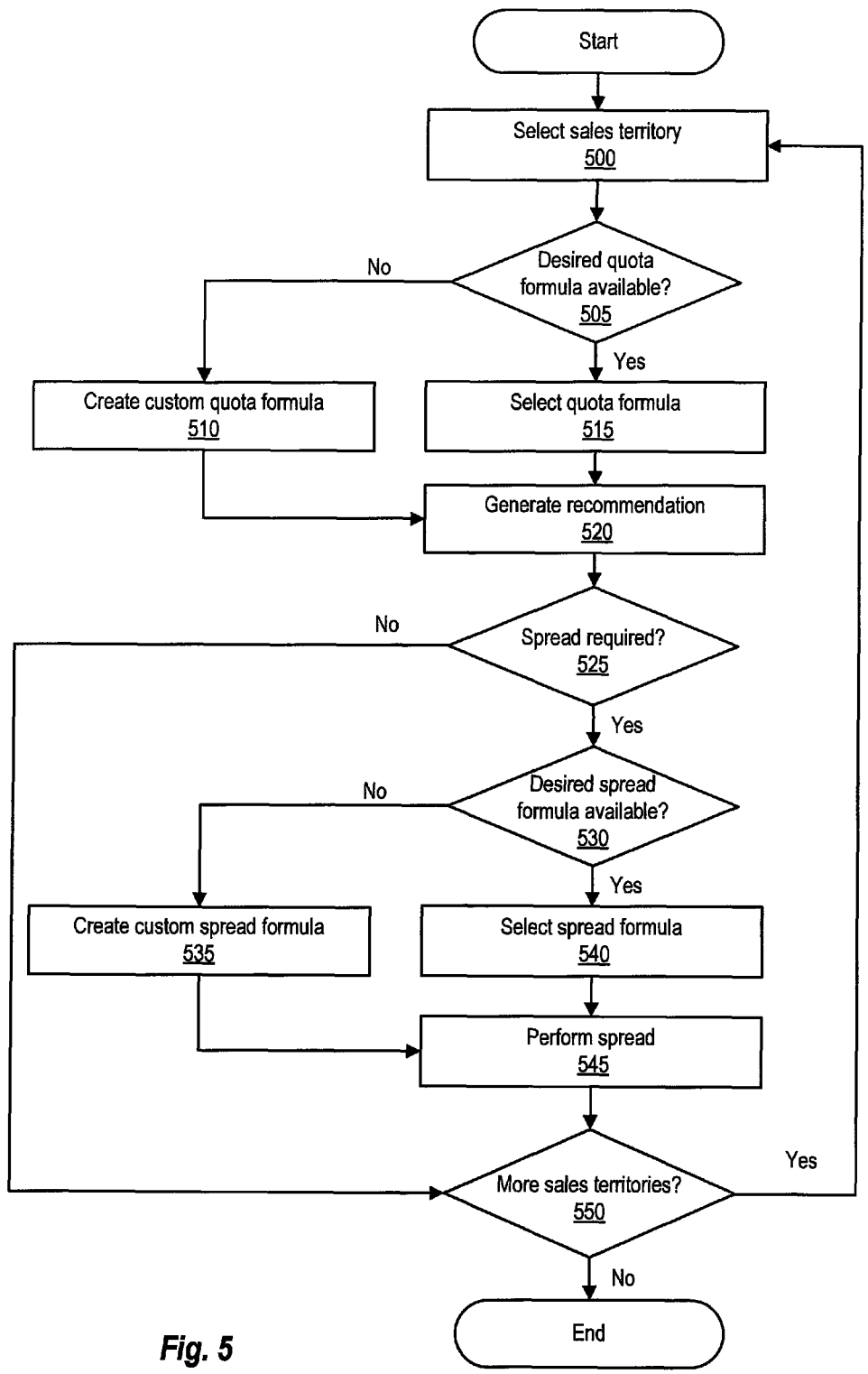
FIG. 5 is a flowchart that illustrates a process of performing a bottom-up analysis, according to one embodiment.

FIG. 5 is a flowchart illustrating a process for performing a bottom-up analysis. According to one embodiment, such a bottom-up analysis includes determining a recommended amount of sales for one or more sales territories, at one or more levels of a sales territory hierarchy. In one embodiment, the bottom-up analysis also includes determining a "spread" or (i.e., how a recommendation is spread among multiple sales territories).

A bottom-up analysis, such as that performed by bottom-up analysis module 135 of FIG. 1, can generate a bottom-up recommendation for each sales territory of a sales territory hierarchy, for example. Such a bottom-up analysis module can provide the ability to detect whether a "Generate recommendation" flag is set for a given sales territory. If a given sales territory is to have a bottom-up recommendation generated, the process shown in FIG. 5 begins with a user selecting a sales territory of a sales territory hierarchy (depicted in FIG. 5 as a select sales territory operation 500). In order to select a sales territory, the user can use a user interface (e.g., user interface 155 of FIG. 1) to view a list of sales territories the user is authorized to access. The user can then indicate which sales territory or sales territories the user wishes to access. To do so, the user selects a leaf sales territory, (e.g., a sales territory at the lowest level of the sales territory hierarchy with no child sales territories below the sales territory). Alternatively, the user can select a sales territory that has child sales territories below the sales territory selected. In an alternative embodiment, a bottom-up analysis module automatically selects a sales territory.

A determination is then made as to whether a desired quota formula is available (depicted in FIG. 5 as a desired quota formula available decision operation 505). Bottom-up recommendation can be generated by a bottom-up analysis module using a quota formula. The bottom-up analysis module can present a list of available quota formulas to a user and the user is then able to determine if a bottom-up recommendation, using one of the quota formulas presented, is desired. For example, the bottom-up recommendation module can present a variety of alternatives to indicate that a bottom-up recommendation can be generated by simply using: a prior amount of sales, the sum of a prior amount and a percentage increase, an average of prior sales amount across several periods of time or sales representatives or sales territories, an exponential average, or a weighted average, to name just a few. If the user wishes to use one of the available quota formulas, the user selects the desired quota formula (depicted in FIG. 5 as a select quota formula operation 515). The table below illustrates additional examples of quota formulas that can be presented to the user.

TABLE 1

Example quota formulas.

| Name | Example |
|---|---|
| Scale a measure from a past period by x % | Prediction is based on 10% growth in Closed Revenue |
| Percentage change in a measure value over 2 consecutive periods | Prediction is based on growth of closed revenue between consecutive years |
| Percentage change in a measure value over 2 named time periods (current and past) | Prediction is based on growth of closed revenue for the selected years |
| X % growth of a measure over 3-year simple moving average | Prediction is based on 10% growth on 3-year simple moving average (SMA) of closed revenue |
| X % growth of a measure over 3-year exponential moving average | Prediction is based on 10% growth on 3-year exponential moving average (EMA) of closed revenue |
| Weighted Average of a measure over the past n years. | Prediction is based on weighted average over the past 4 years. |

A user can activate or deactivate a quota formula by, for example, setting a status flag to either active or inactive. Inactivating a quota formula makes it unavailable to be used to generate a recommendation. A user can also configure the bottom-up analysis module by specifying one or more global parameters of the quota formulas, which come into play when default values are not provided for a given sales territory. Example parameters that can be configured include a name of the parameter, a dimension name of a dimension as defined in a sales data cube, and a generation level of a dimension in the sales data cube. A user can specify default values for any configurable parameter, such as those in the previous example.

Once quota formulas are configured, the administrator associates a quota formula to the active sales territories. The administrator can associate a quota formula to a given sales territory, set one quota formula as a default, and set sales territory-specific default parameter values. Typically, only active quota formulas are associated with a sales territory. Typically quota formulas with status set to inactive are not executed, even if defined as the default quota formula and should not be displayed as available for use. However, inactive quota formulas are typically available within an MDX editor, where they can be modified, and later set to active status. A user can also remove a quota formula associated with a given sales territory. The remove operation only removes the association with the sales territory. The quota formula will typically continue to exist in the schema. That is, a user can still access and modify a quota formula even if the quota formula is no longer selected as the default quota formula.

If a desired quota formula is not available, the process allows a user to create a custom quota formula for a recommendation (depicted in FIG. 5 as a create custom quota formula operation 510). The bottom-up analysis module can present the user with user interface elements and controls that allow the user to select from drop down lists to create a quota formula, for example. Alternatively, the bottom-up analysis module can invoke an MDX editor and allow the user to specify the desired quota formula by entering MDX commands. While MDX is used as an example, it will be appreciated that a system of the present invention is not limited thereto, and any of a number of other programming languages and interfaces can be used. Once a quota formula has been generated, the quota formula can be stored in one or more OLTP tables. Storing quota formulas apart from the sales data cube facilitates concurrent development of quota formulas by multiple users. Multiple users can develop and store quota formulas for the same sales data such that various analyses can proceed more quickly and efficiently. For example, a user A can develop a quota formula to generate a recommendation for a given sales territory hierarchy based on a first percentage distribution of expected sales performance for sales territories of the sales territory hierarchy. Concurrently, a user B can develop a generate a different recommendation for the sales territory hierarchy based on an alternative percentage distribution of expected sales performance for sales territories of the sales territory hierarchy. For example, user A can specify in a first quota formula that a recommendation for a sales territory having two child sales territories should be the sum of recommendations for the two sales territories, while user B can specify, in a separate quota formula, that the recommendation for the sales territory should be the sum of a multiple of a recommendation for the first sales territory and a different multiple for the second sales territory (e.g., $P=0.6*T1+0.4*T2$, where P is the recommendation for the parent sales territory and T1 and T2 are the recommendations for the first and second constituent sales territories, respectively. The foregoing is merely one example of the ways in which multiple users can concurrently develop quota formulas to analyze data from multiple perspectives.

When creating a custom quota formula using an MDX editor, an outline, or formula signature, can be made available for the user to construct the MDX formula. For example, a bottom-up analysis module, such as bottom-up analysis 135 of FIG. 1, can generate a visual representation of a sales data cube. The outline can be presented to a user, for example, in the form of a tree, wherein each node or leaf of the tree includes one or more dimensions and members of the sales data cube such that each dimension and member of the sales data cube is displayed. The outline can be populated, for example using a Java API or data control mechanism specific to the sales data cube. The bottom-up analysis module can also provide an exhaustive list of MDX functions that represent functions available to a user in generating a custom quota formula. This list can be stored in a separate file and retrieved therefrom. Alternatively, the list can be loaded into, for example, an MDX editor and displayed to a user. When a user selects a given quota formula, a signature for the quota formula is copied into the editor area. The user is then allowed to edit the quota formula. Certain fields can be automatically updated based on the contents of editor and a parameter table. For example, last run date, created date, updated date, created by, updated by fields can be stored in a parameter table and updated automatically as part of a create custom quota formula operation.

During the creation of a custom quota formula, a user can invoke an MDX editor within the quota management system. First a user selects a given sales territory. The quota management system passes an existing MDX expression for the given sales territory (or empty string if no MDX expression has previously been associated with the given sales territory) and a template to the MDX editor. The template consists of an MDX expression with one or more substitution variables. The substitution variables include one or more variables that are available to be substituted into the MDX expression. The user can then select which variables the user wants to use in the MDX expression. Next, the user selects the validate button and the MDX editor retrieves the MDX expression (along with parameters replaced by default values, if the user does not specify parameters) from editor text box, substitutes the expression into the MDX template, and invokes validation against the sales data cube.

The validation process generates a recommendation for the given sales territory. Once the user is satisfied with the result generated by the custom MDX expression, the user indicates that the MDX expression should be applied and the updated MDX expression will be saved. For example, the quota management system can save the MDX expressions for this sales territory in an OLTP table in sales data 185 of FIG. 1.

Once the desired quota formula is selected, or a custom quota formula created, one or more recommendations can then be generated (a generate recommendation operation 520), where the bottom-up analysis module generates a recommendation. An example MDX query to generate a bottom-up recommendation is shown below. One variable in the MDX query below is the Quota Prediction Formula; which can be either be chosen from a set of pre-defined quota formula templates or by developing a custom quota formula. The "TotalPredictionOverTerritory" parameter specifies an operation to be performed. In this example, the operation is to generate a recommendation for the entire sales territory. The "TerritoryCube" parameter specifies a sales data cube for which a recommendation is to be generated.

---

WITH SET Territory SetName as 'The MDX set definition for a given sales territory'
WITH MEMBER QuotaPredictionFormula as 'The prediction metric'
WITH MEMBER TotalPredictionOverTerritory 'SUM(TerritorySetName , QuotaPredictionFormula)
Select {[TotalPredictionOverTerritory]} on columns
From [TerritoryCube]

---

Next, a determination is made as to whether a spread is needed (depicted in FIG. 5 as a spread required decision operation 525). At this point, a user determines whether the sales territory for which a recommendation has been made includes any constituent sales territories for which a recommendation has not been made. If recommendation may still be needed for any of the constituent sales territories, a determination is made as to such a need for the remaining constituent sales territories (depicted in FIG. 5 as a desired spread formula available decision operation 530). Otherwise, the process proceeds with making a determination as to whether one or more sales territories needing recommendations remain (depicted in FIG. 5 as a more sales territories decision operation 550).

If a spread is desired, and a spread formula is available that is appropriate, the user can select the formula to use to spread the recommendations (depicted in FIG. 5 as a select spread formula operation 540). For example, the user can select an equal distribution, or a spread based on a prior peer contribution. The user can also choose an amount to spread. For example, the user can select whether the user wishes to spread the entire amount, or a portion. If a recommendation is based on a prior year's sales plus a percent increase, the user can spread the percent increase according to one spread technique and the prior year's sales amount according to another technique, for example.

Alternatively, if a suitable spread formula is not available, a user can create a formula using drop down menus listing operations and relationships (depicted in FIG. 5 as a create custom formula operation 535). In this alternative, a user can create a formula using MDX or some other programming language. Once created, such formulas can be stored in a table and multiple users can concurrently develop and store formulas.

At perform spread operation 545, a recommendation is spread among sales territories. This can be an iterative operation. A determination is then made as to whether a recommendation should be generated for more sales territories in the sales territory hierarchy. If so, the process loops back to select sales territory 500. Otherwise, the process ends.

Figure 6:
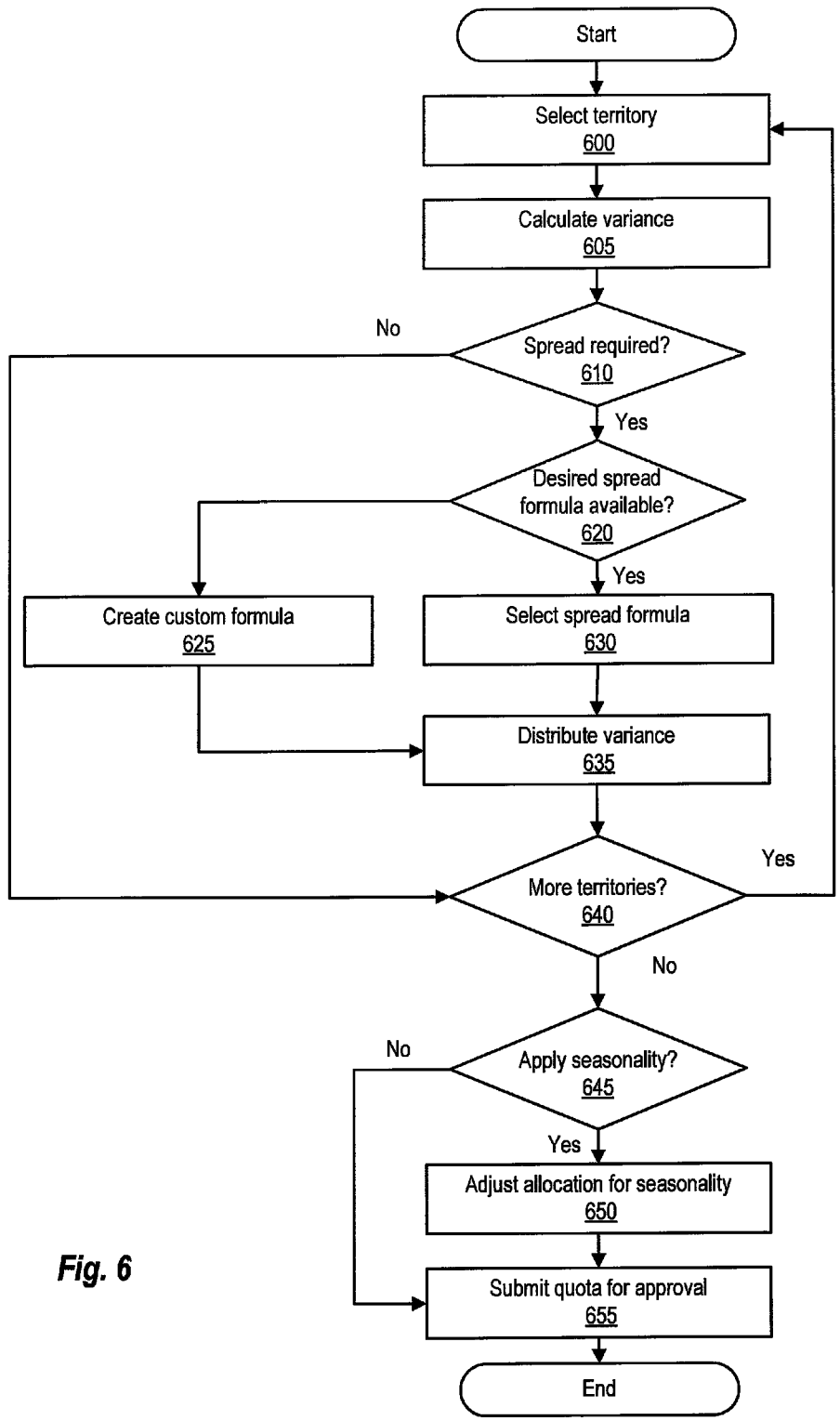
FIG. 6 is a flowchart that illustrates a process of performing quota allocation, according to one embodiment.

FIG. 6 is a flowchart that illustrates a process of performing quota allocation. Sales quotas are often generated to cover an annual period. However, these sales quotas can be distributed, maintained and tracked over more granular periods, such as quarter, month, or weeks. Sales representatives can also be compensated based on different time periods. Quota allocation can be performed at the annual (year) level, and subsequently distributed with increased granularity down to the lowest level of granularity defined in the quota management system. Quotas can also be persisted against the finest granularity defined in the quota management system. That is, if the lowest level of granularity is set to quarters, there will only be a single level of hierarchy for the year that is supported in the time dimension of the quota management system.

According to one embodiment, a user begins by selecting a territory (depicted in FIG. 6 as a select territory operation 600). This operation occurs after a top-down quota and bottom-up recommendation have been generated for the sales territory. Next, a user calculates a variance, or difference, between a top-down quota for the selected sales territory and a bottom-up recommendation for the sales territory (depicted in FIG. 6 as a calculate variance operation 605). Again, this operation can be automatically performed by a quota allocation module.

In order to specify an accurate quota for a sales territory, any differences between a top-down quota and a bottom-up recommendation should be accounted for. For example, if a bottom-up recommendation for a sales territory is higher than the top-down quota for the same territory, a quota can be set for the sales territory based on the bottom-up recommendation. However, if a bottom-up recommendation for a sales territory is lower than the top-down quota, the difference, or variance, will need to be addressed. Simply setting the quota based on the higher top-down quota, while possible, may well be too aggressive.

If a variance is to be distributed, a user can determine whether a given sales territory has any constituent territories to which a portion of the calculated variance should be spread (depicted in FIG. 6 as spread required decision operation 610). If no variances needs to be distributed, (e.g., the sales territory is a leaf sales territory or variance has already been spread to all other sales territories), the process proceeds to a decision regarding the need to process additional, discussed below. If a spread is required, the process proceeds with a determination as to the spread desired (depicted in FIG. 6 as to a desired spread formula available decision operation 620). Spreading a variance among a number of constituent sales territories provides a user a way to factor in historic contributions of sub-territories while allocating quotas. If a suitable spread formula is available, the user can select an algorithm or formula to use to spread the recommendations (depicted in FIG. 6 as a select spread formula operation 630). For example, the user can select an equal distribution, or a spread based on a prior peer contribution, to name a few. In one example, a user setting a quota for a given sales territory can factor in the contribution percentage of closed detail revenue the previous year while reconciling the variance or distributing the quota among peers.

The user can also choose an amount to spread. For example, the user can select whether the user wishes to spread the entire amount, or a portion. The user can also select the scope of a spread. By default, a wide scope is used—the variance is spread to all constituent sales territories owned by a sales manager. However, a user can change the scope to only include selected sales territories (e.g., in case the manager wants to spread an arbitrary amount among selected constituent territories).

The table below shows several examples of spread formulas that can be provided.

TABLE 2

Example spread formulas.

| Name | Description | Metric Used |
| --- | --- | --- |
| Distribute Equally | Spreads the source equally | |
| Closed Detailed Revenue Ratio | Spreads the source based on the ratio of closed detail revenues by closed date for the selected year | Closed Detail Revenue By Close Date |
| Unadjusted Forecast Ratio | Spreads the source based on the ratio of unadjusted forecasted revenues for the selected year | Unadjusted Forecast |
| Quota Ratio | Spreads the source based on the ratio of quota for the selected year | Quota |
| Prediction Ratio | Spreads the source based on the ratio of prediction for the selected year | Prediction |

The source, in this context, is the name of the column that includes data that needs to be allocated. For example, a user may wish to spread variance or adjusted quota among constituent sales territories. In one embodiment, a user can select an ad-hoc option that allows the user to enter an arbitrary amount to spread.

If a suitable spread formula is not available, the user is allowed to create a custom formula (depicted in FIG. 6 as a create custom formula operation 625). A user can create a formula, for example, using drop down menus listing operations and relationships. Alternatively, a user can create a formula (e.g., using MDX or some other programming language). Similar to the recommendation and spread formulas discussed above, a user can create a formula to use to spread variance among multiple sales territories and store the created formula in a table, such as an OLTP table. Multiple users are thus able to concurrently develop and store such formulas.

Using these capabilities, a user can spread a variance among multiple sales territories according to the selected or created formula (depicted in FIG. 6 a distribute variance operation 635). Performing a spread operation provides the ability to easily reconcile a variance between a top-down goal and bottom-up recommendation. Such spread operations minimize, and can even eliminate, variances such as those discussed herein. Spread operations such as those described herein can be based, for example, on peer ratios between territories, as well as by making sure the variance is completely absorbed (consumed) among the constituent territories. A similar scenario arises when a user chooses to ignore a bottom-up recommendation for a sales territory, and allocates a quota solely on the basis of, for example, peer ratios. In both cases, peer ratios can be computed by examining the contribution of a sales territory metric value for a period (e.g., closed bookings in 2007) to the total value of the same metric for all the territories combined. This contribution percentage is computed for all selected constituent territories and applied to the source amount that needs to be distributed.

Next the process proceeds with a determination as to whether more sales territories used to be processed (depicted in FIG. 6 as a more sales territories operation 640). If more sales territories of the sales territory hierarchy require a quota allocation, the process returns to select territory operation 600. Otherwise, the process proceeds with a determination as to the application of a seasonality factor (depicted in FIG. 6 as an apply seasonality decision operation 645). If the user decides not to apply a seasonality factor, the process proceeds with publishing quotas (as depicted in FIG. 6 by publish quota operation 655).

Alternatively, a user may decide to apply seasonality (depicted in FIG. 6 as an adjust allocation for seasonality operation 650). For example, an annual quota can be distributed down to finer periods, while also factoring in seasonal expectations in sales. This expectation can be represented as a seasonality factor, which reflects the share of quota for the season (period). Seasonality refers to the variability introduced by seasons (or time periods) on a metric. In one embodiment, seasonality is a representation of variability in sales by sales periods. The quota allocation module identifies the sales calendar, which can specify a timeframe for which quotas are set and revenue is tracked. The quota allocation module can describe the expected percentage contribution of the granular period (quarter, month, and week) to the sales calendar itself. The percentage contribution can be used to determine the sales expected of a sales representative for the period in relation to the sales quota for the year. In one example, sales in the first quarter period is roughly 10% of annual sales; while last quarters' sales are roughly contribute to 40% amount. These seasonality factors could be used by management to raise expectation for first quarter. The quota allocation module can determine the seasonality factor for a particular year for a particular sales region (territory). This is helpful in the case where different geographic regions have different variations in sales depending on the quarter or month of the year. Therefore, the quota allocation module can specify seasonality factors at the sales territory level so one can take into account the effect of seasonality on individual sales territories.

Once a user distributes any variance between a top-down goal for a given sales territory and a bottom-up recommendation for the sales territory, or reconciles the two, the user is left with a value that ideally represents an accurate quota for the sales territory. This value can be assigned to the sales territory as a quota for the sales territory. Once a quota has been established for one or more sales territories of a sales territory hierarchy, a user can submit the quota for approval (depicted in FIG. 6 as a submit quota for approval operation 655). For example, the user can submit the quota to a supervisor or executive. Once the quota is approved, the quota's status can be updated to reflect that the quota is approved. For example, the quota's status can be changed from uncommitted to committed.

Figure 7:
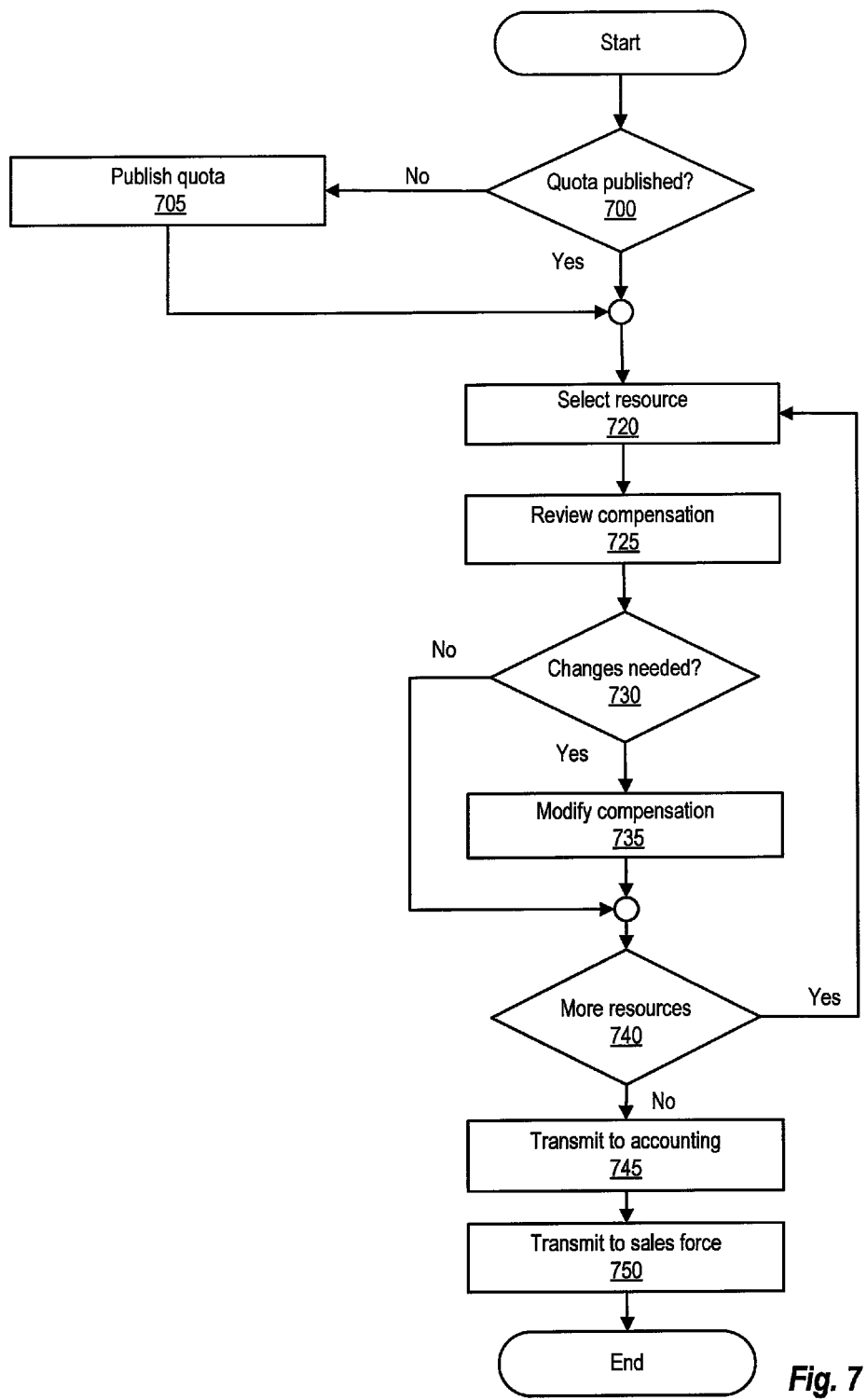
FIG. 7 is a flowchart that illustrates a process of performing compensation management operations, according to one embodiment.

FIG. 7 is a flowchart that illustrates a process of setting up a compensation plan, according to one embodiment. In this process, a user determines, whether a quota has been published (depicted in FIG. 7 as a quota published decision operation 700). If a quota has not been published, the process proceeds with a determination as to whether the given quota should be published (depicted in FIG. 7 as a publish quota operation 705). Publishing a quota can include determining a status of the quota. For example, if a quota's status is "Not published," or "Pending revision" a quota allocation module, such as quota allocation module 140 of FIG. 1, can publish the quota. On the other hand, if the quota's status is, "Published" or "Excluded" for example, the quota allocation module does not publish the quota. Similarly, publishing a quota can involve determining the amount of the quota and comparing that amount with predefined limits. For example, if a quota is zero, or a negative number, the quota allocation module does not publish the quota. Publishing a quota can also involve determining whether seasonality has been applied for all sales territories and sales force personnel.

A quota allocation module can, for example, set a flag or change a quota's status to reflect that the quota is published. For example, the quota allocation module can clear a "Allow quota edit" flag to indicate that the quota is published and can no longer be modified. The quota allocation module can also set a time/date stamp to indicate when the quota was published. The quota allocation module can publish individual sales territory quotas or multiple quotas concurrently. Once a quota is published, the quota can be viewed by additional members of an organization. For example, an organization's accounting department can view published quotas in determining compensation amounts.

Once the quota is published, the process proceeds to a select resource operation 720. A resource, in this context, is a member of the sales force, e.g., a sales representative. An administrator can select a resource to perform compensation specification operations for the given resource. A user can then view past and predicted compensation for the selected resource (depicted in FIG. 7 as a review compensation operation 725). For example, a user can view salary and/or bonus information for the resource.

The process then proceeds with a determination as to whether compensation needs to be modified (depicted in FIG. 7 as a changes needed decision operation 730). Numerous factors can be evaluated when determining if the compensation for a resource should be modified. For example, if a user determines that a projected bonus is smaller for the upcoming year than the past year, the user may wish to modify the bonus in order to provide more incentive to the resource. Alternatively, the user can decrease the compensation specified for the user, for example, in response to a cost-cutting organization directive. If changes are needed, the process proceeds with making the modification (depicted in FIG. 7 as a modify compensation operation 735). If no changes are needed, a user is then able to determine whether there are more resources (depicted in FIG. 7 as a more resources decision operation 740). If so, the process returns to select resource operation 720. If not, the process proceeds with transmitting a compensation plan to the sales force and accounting department (depicted in FIG. 7 as transmit to accounting operation 745 followed by a transmit to sales force operation 750).

In one embodiment, compensation planning is performed by a compensation planning solution external to the quota management system. In this embodiment, once a quota is published, a notification is sent to a compensation analyst. The notification can include information about a quota, a start and/or end date of a compensation planning period, a start and/or end date of a quota planning period, and a quarterly/monthly/weekly breakdown of the quota. Once the compensation analyst receives the notification, the compensation analyst can update the appropriate compensation plan.

The flowcharts described above depict processes according to one embodiment of the present invention. It is appreciated that operations discussed herein may consist of directly entered commands by a computer system user or by steps executed by application specific hardware modules. Certain embodiments can include steps executed by software modules, or operations performed by hardware modules. The functionality of operations referred to herein may correspond to the functionality of modules or portions of modules.

The operations referred to herein may be performed by modules or portions of modules (e.g., software, firmware or hardware modules). For example, although the described embodiment can include software modules and/or manually entered user commands, the various example modules can be implemented as application-specific hardware modules. If implemented as software modules, embodiments can include script, batch or other executable files, or combinations and/or portions of such files. Such software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub modules to be executed as multiple computer processes, and, optionally, on multiple computers. Moreover, alternative embodiments may combine multiple instances of a particular module or sub module. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow charts may be executed by a module (e.g., a software module) or a portion of a module or a computer system user using, for example, a computer system such as the computer system described subsequently herein. Thus, the methods described herein, the operations thereof and modules therefore may be executed on a computer system configured to execute the operations of the methods and/or may be executed from computer-readable storage media. The methods may be embodied in a machine-readable and/or computer-readable storage medium for configuring a computer system to execute the method. Thus, software modules of embodiments of the present invention may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The software modules described herein may be received by such a computer system, for example, from computer-readable storage media. The computer-readable storage media may be permanently, removably or remotely coupled to the computer system. The computer-readable storage media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like. In a UNIX-based embodiment, such software modules may be embodied in a file which may be a device, a terminal, a local or remote file, a socket, a network connection, or other expedient of communication or state change. Other new and various types of computer-readable media may be used to store and/or transmit the software modules discussed herein.

FIG. 8A is a screenshot showing a view of a user interface, according to one embodiment. In one embodiment, a user of a quota management system, such as the quota management system 100 of FIG. 1, can use the user interface of FIG. 8A to perform quota management operations. The user interface includes a list of tasks 802 that allows a user to view and manage various aspects related to top-down goals, bottom up recommendations, and quotas.

The user interface includes a description field 804 for a selected sales quota. The user interface also provides an area 806 for a user to select and edit a sales quota as well as an area 808 to view and edit aspects related to a selected sales quota. In some embodiments, the user interface includes a display of a variance associated with a selected sales quota.

Figure 8B:
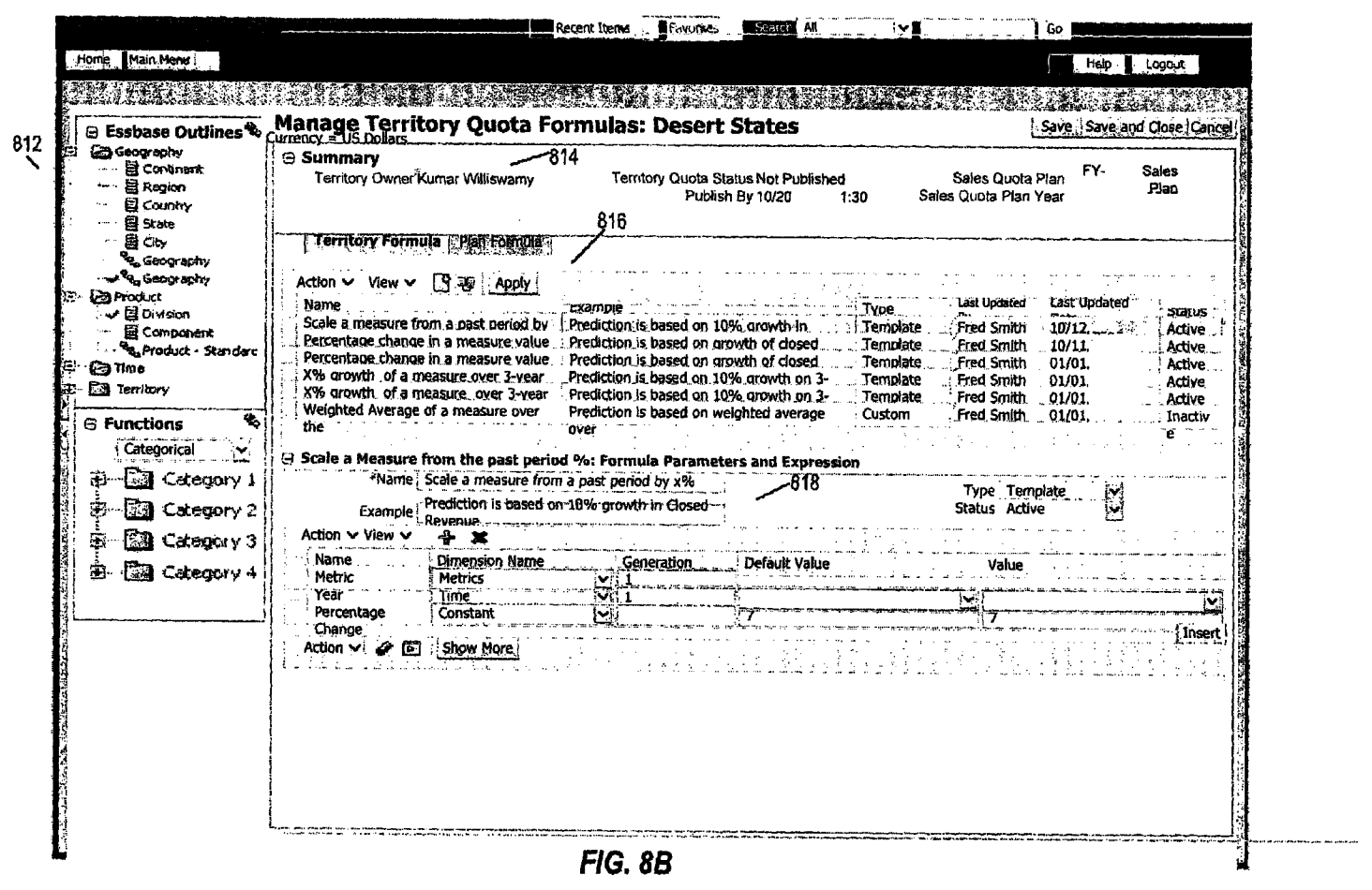

FIG. 8B is a screenshot showing a view of a user interface, according to one embodiment. In one embodiment, a user of a quota management system, such as the quota management system 100 of FIG. 1, can use the user interface of FIG. 8B to create and edit quota and/or spread formulas. The user interface includes a menu 812 that allows a user to navigate through the quota management system based on dimensions of an OLAP cube and select various functions. The user interface also displays a summary 814 of a selected sales quota. At 816, the user interface displays one or more formulas that can be selected to calculate a sales quota for a given territory. Further details of a selected formula are displayed at 818.

Figure 8C:
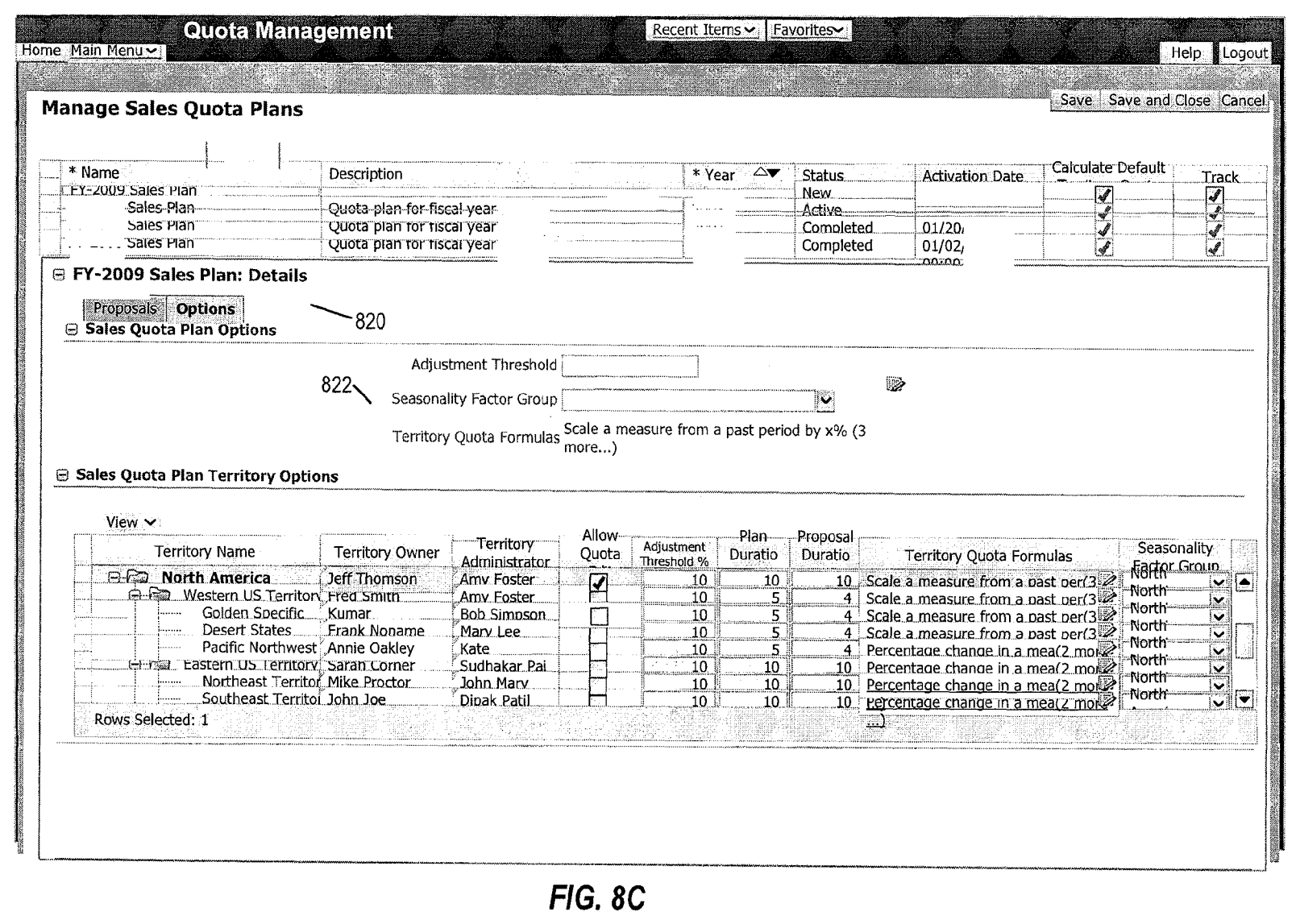

FIG. 8C is a screenshot showing a view of a user interface, according to one embodiment. FIG. 8C displays additional details at 820 and options at 822 of a selected sales quota.

Figure 9:
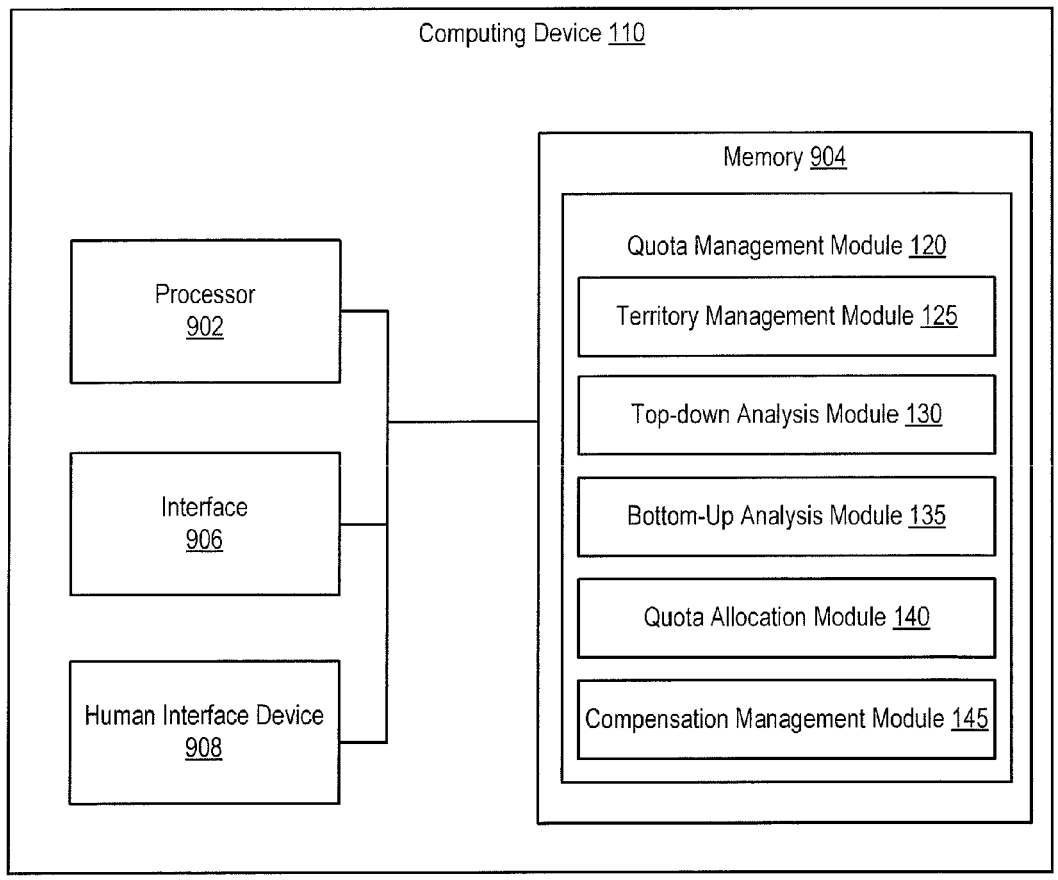
FIG. 9 is a block diagram of a computing device illustrating how a quota management module can be implemented in software, according to one embodiment.

FIG. 9 is a block diagram of a computing device 110 illustrating how a quota management module (e.g., quota management module 120 of FIG. 1) can be implemented in software, according to one embodiment. By executing the software that implements quota management module 120, computing device 110 becomes a special purpose computing device that is configured to perform quota management operations, including reconciling a top-down goal with a bottom-up recommendation.

Computing device 110 can be a personal computer, network appliance, server, personal digital assistant, mobile phone, storage controller (e.g., an array controller, tape drive controller, or hard drive controller), laptop computer, or the like. In general, computing device 110 is configured to execute software or otherwise provide appropriate functionality to act as a component of the system described herein.

As illustrated, computing device 110 includes one or more processors 902 (e.g., microprocessors, programmable logic devices (PLDs), or application specific integrated circuits (ASICs)) configured to execute program instructions stored in memory 904. Memory 904 can include various types of RAM, Read Only Memory (ROM), Flash memory, micro electro-mechanical systems (MEMS) memory, magnetic core memory, and the like. Memory 904 can include both volatile and non-volatile memory. Computing device 110 also includes one or more interfaces 906. Processor 902, interface 906, and memory 904 are coupled to send and receive data and control signals by a bus or other interconnect.

Interface 906 can include a network interface to various networks (e.g., such as network 170 of FIG. 1) and/or interfaces to various peripheral buses. For example, interface 906 can include a network interface (e.g., implemented as a network interface card) via which messages generated by computing device 110 can be sent to other devices (e.g., such as computing device 150 of FIG. 1) in order to, for example, submit a quota for approval. Interface 906 can also include an interface to one or more storage devices (e.g., on which quota management information is stored).

In this example, program instructions and data executable to implement all or part of quota management module 120 are stored in memory 904. Quota management module 120 includes a territory management module 125, top-down analysis module 130, bottom-up analysis module 135, quota allocation module 140, and compensation specification module 145 which are configured to define and organize sales territories of a sales territory hierarchy and perform quota management operations using both a top-down approach and a bottom-up approach (e.g., using processes similar to the processes shown in FIGS. 2-7).

Human interface device 908 can include one or more of a variety of different human user input and/or output devices, and/or one or more interfaces to such input and/or output devices. Such input and/or output devices can include monitors or other displays, keyboards, keypads, mice, electronic tablets, touch screens, audio speakers, and the like. Input (e.g., requesting access to sales performance data) to and output from (e.g., a recommendation) computing device 110 can be received and/or sent via such an input and/or output device.

The program instructions and data implementing quota management module 120 can be stored on various computer readable storage media such as memory 904. In some embodiments, such software is stored on a computer readable storage medium such as a compact disc (CD), digital versatile disc (DVD), hard disk, optical disk, tape device, floppy disk, and the like). In order to be executed by processor 902, the instructions and data can be loaded into memory 904 from the other computer readable storage medium. The instructions and/or data can also be transferred to computing device 110 for storage in memory 904 via a network such as the Internet or upon a carrier medium.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of a computer system). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

What is claimed is:

1. A method comprising:
    receiving a goal, wherein
        the goal indicates a target amount of sales for a first sales territory of a hierarchy of sales territories;
    generating a recommendation, wherein
        the generating the recommendation comprises calculating a predicted amount of sales for the first sales territory;
    detecting, by one or more processors, a variance between the goal and the recommendation; and
    automatically generating, by the one or more processors, a quota, wherein the generating is based on the variance, and
        the quota indicates a first assigned amount of sales for the first sales territory.

2. The method of claim 1, wherein
the hierarchy of sales territories comprises
    the first sales territory at a first level of the hierarchy of sales territories, and
    a plurality of child sales territories at levels below the first level in the hierarchy of sales territories.

3. The method of claim 1, further comprising:
modifying the goal, wherein
    the modifying the goal comprises at least one of
        increasing the target amount of sales, or
        decreasing the target amount of sales; and
allocating a portion of the goal to each sales territory of the hierarchy of sales territories.

4. The method of claim 1, wherein
the specifying the quota comprises
    in response to a detection of the variance between the goal and the recommendation:
        adding a portion of the variance to a recommended amount of sales for at least one sales territory of the hierarchy of sales territories, wherein
            a sum of the portion of the variance and the recommended amount corresponds to a quota for that sales territory.

5. The method of claim 1, wherein
the first sales territory the of the hierarchy of sales territories is based on at least one dimension of an online analytical processing (OLAP) cube, and
the OLAP cube includes at least the dimensions of geography, product, customer account, customer size, industry type, and time.

6. The method of claim 1, wherein
the recommendation is, at least in part, based on past sales performance data in the first sales territory.

7. The method of claim 1, further comprising:
using a pre-defined formula to calculate the predicted amount of sales.

8. The method of claim 1, further comprising:
using a customer-modified formula to calculate the predicted amount of sales.

9. The method of claim 1, further comprising:
adjusting the quota based on seasonality, wherein
    the seasonality indicates time-based variability in sales in the first sales territory.

10. The method of claim 1, wherein
the quota indicates a second assigned amount of sales for a first sales representative.

11. A computer program product comprising:
a plurality of instructions, comprising
    a first set of instructions, executable on a computer system, configured to receive a goal, wherein
        the goal indicates a target amount of sales for a first sales territory of a hierarchy of sales territories,
    a second set of instructions, executable on the computer system, configured to generate a recommendation, wherein
        the second set of instructions comprises
            a first subset of instructions, executable on the computer system, configured to a predicted amount of sales for the first sales territory,
    a third set of instructions, executable on the computer system, configured to detect a variance between the goal and the recommendation, and
    a third set of instructions, executable on the computer system, configured to automatically generate a quota, wherein the generation of the quota is based on the variance, and the quota indicates a first assigned amount of sales for the first sales territory; and a computer-readable storage medium, wherein the instructions are encoded in the computer-readable storage medium.

12. The computer program product of claim 11, wherein the hierarchy of sales territories comprises the first sales territory at a first level of the hierarchy of sales territories, and a plurality of child sales territories at levels below the first level in the hierarchy of sales territories.

13. The computer program product of claim 11, wherein the instructions further comprise:

a fifth set of instructions, executable on the computer system, configured to modify the goal, wherein
the modification of the goal comprises at least one of
increasing the target amount of sales, or
decreasing the target amount of sales; and a sixth set of instructions, executable on the computer system, configured to allocate a portion of the goal to each sales territory of the hierarchy of sales territories.

14. The computer program product of claim 11, wherein the third set of instructions comprises:

a first subset of instructions, executable on the computer system, configured to, in response to a detection of the variance between the goal and the recommendation, add a portion of the variance to a recommended amount of sales for at least one sales territory of the hierarchy of sales territories, wherein
a sum of the portion of the variance and the recommended amount corresponds to a quota for that sales territory.

15. The computer program product of claim 11, wherein the first sales territory the of the hierarchy of sales territories is based on at least one dimension of an online analytical processing (OLAP) cube, and the OLAP cube includes at least the dimensions of geography, product, customer account, customer size, industry type, and time.

16. The computer program product of claim 11, wherein the recommendation is, at least in part, based on of past sales performance data in the first sales territory.

17. The computer program product of claim 11, wherein the instructions further comprise:

a fifth set of instructions, executable on the computer system, configured to use a pre-defined formula to calculate the predicted amount of sales.

18. The computer program product of claim 11, wherein the instructions further comprise:

a fifth set of instructions, executable on the computer system, configured to use a customer-modified formula to calculate the predicted amount of sales.

19. The computer program product of claim 11, wherein the instructions further comprise:

a fifth set of instructions, executable on the computer system, configured to adjust the quota based on seasonality, wherein
the seasonality indicates time-based variability in sales in the first sales territory.

20. A system comprising:

a processor; and a memory, wherein
the memory stores program instructions executable by the processor to
receive a goal, wherein
the goal indicates a target amount of sales for a first sales territory of a hierarchy of sales territories,
generate a recommendation, wherein
the processor is configured, in generating the recommendation, to calculate a predicted amount of sales for the first sales territory,
detect a variance between the goal and the recommendation, and
automatically generate a quota, wherein
the generation of the quota is based on the variance, and
the quota indicates a first assigned amount of sales for the first sales territory.

\* \* \* \* \*

UNITED STATES PATENT AND TRADEMARK OFFICE
CERTIFICATE OF CORRECTION

| | | |
|---|---|---|
| PATENT NO. | : 8,626,572 B2 | Page 1 of 1 |
| APPLICATION NO. | : 12/763520 | |
| DATED | : January 7, 2014 | |
| INVENTOR(S) | : Colliat et al. | |

It is certified that error appears in the above-identified patent and that said Letters Patent is hereby corrected as shown below:

In the Specification

In column 8, line 48, delete "Fusion™" and insert -- Fusion (TM) --, therefor.

In column 17, line 30, delete "perforin," and insert -- perform, --, therefor.

In column 18, line 19-20, delete "perfounance." and insert -- performance. --, therefor.

In the Claims

In column 30, line 27, in Claim 5, delete "the of the" and insert -- of the --, therefor.

In column 31, line 36, in Claim 15, delete "the of the" and insert -- of the --, therefor.

Signed and Sealed this
Seventh Day of July, 2015

Michelle K. Lee
*Director of the United States Patent and Trademark Office*